US007953654B2

(12) United States Patent
Abifaker

(10) Patent No.: US 7,953,654 B2
(45) Date of Patent: May 31, 2011

(54) INTEGRATION OF GIFT CARD SERVICES FOR MOBILE DEVICES AND SOCIAL NETWORKING SERVICES

(75) Inventor: Basil Munir Abifaker, San Diego, CA (US)

(73) Assignee: Transaction Wireless, Inc., San Diego, CA (US)

( * ) Notice: Subject to any disclaimer, the term of this patent is extended or adjusted under 35 U.S.C. 154(b) by 101 days.

(21) Appl. No.: 12/022,127

(22) Filed: Jan. 29, 2008

(65) Prior Publication Data

US 2009/0192928 A1   Jul. 30, 2009

(51) Int. Cl.
*G06Q 40/00* (2006.01)
(52) U.S. Cl. ........................................................ 705/35
(58) Field of Classification Search ................. 463/42; 700/26; 705/14.27, 319, 30–45; 715/738; 717/177
See application file for complete search history.

(56) References Cited

U.S. PATENT DOCUMENTS

| | | | |
|---|---|---|---|
| 6,321,211 B1 * | 11/2001 | Dodd ............................. | 705/26 |
| 6,685,093 B2 | 2/2004 | Challa et al. | |
| 6,736,322 B2 | 5/2004 | Gobburu et al. | |
| 7,006,993 B1 | 2/2006 | Cheong et al. | |
| 7,028,906 B2 | 4/2006 | Challa et al. | |
| 7,070,103 B2 | 7/2006 | Melick et al. | |
| 7,209,903 B1 | 4/2007 | Mamdani et al. | |
| 7,240,843 B2 * | 7/2007 | Paul et al. ................ | 235/472.01 |
| 2001/0049636 A1 * | 12/2001 | Hudda et al. ..................... | 705/26 |
| 2001/0054003 A1 | 12/2001 | Chien et al. | |
| 2002/0004374 A1 | 1/2002 | Kantola et al. | |
| 2002/0004746 A1 | 1/2002 | Ferber et al. | |
| 2002/0065713 A1 | 5/2002 | Awada et al. | |
| 2002/0091569 A1 | 7/2002 | Kitaura et al. | |
| 2002/0095333 A1 | 7/2002 | Jokinen et al. | |
| 2002/0128903 A1 | 9/2002 | Kernahan | |
| 2002/0198777 A1 | 12/2002 | Yuasa | |
| 2003/0004808 A1 | 1/2003 | Elhaoussine et al. | |
| 2003/0058261 A1 | 3/2003 | Challa et al. | |

(Continued)

FOREIGN PATENT DOCUMENTS

JP    2004-287997    10/2004

(Continued)

OTHER PUBLICATIONS

Carlo Longino, More on Mobile Fulfillment, internet web page, last retrieved from http://mobhappy.com/blog1/2006/08/16/more-on-mobile-fulfillment/ on Jul. 10, 2007.

*Primary Examiner* — James P Trammell
*Assistant Examiner* — Tien C Nguyen
(74) *Attorney, Agent, or Firm* — Mintz, Levin, Cohn, Ferris, Glovsky and Popeo, P.C.

(57) ABSTRACT

Methods and apparatus, including computer program products, for social networking services integrated with gift card services. In general, a profile of a member of a social networking service may be presented with one or more merchant credit services for prepaid merchant account credit, data characterizing a request to provide a credit service from the merchant credit services and a mobile phone number associated with an intended recipient of the first credit service may be received, and a message may be caused to be sent to the mobile phone number, where the message characterizes provision of the first credit service to the intended recipient. Interest in the credit service may be tracked and associated with a loyalty indicator associated with the member.

21 Claims, 11 Drawing Sheets

U.S. PATENT DOCUMENTS

| | | | |
|---|---|---|---|
| 2003/0074259 A1 | 4/2003 | Slyman et al. | |
| 2003/0074265 A1* | 4/2003 | Oshima | 705/26 |
| 2003/0144035 A1 | 7/2003 | Weinblatt et al. | |
| 2003/0220839 A1 | 11/2003 | Nguyen | |
| 2003/0233276 A1 | 12/2003 | Pearlman et al. | |
| 2004/0118914 A1 | 6/2004 | Smith et al. | |
| 2004/0128197 A1 | 7/2004 | Bam et al. | |
| 2004/0230489 A1* | 11/2004 | Goldthwaite et al. | 705/26 |
| 2005/0029358 A1 | 2/2005 | Mankins | |
| 2005/0033635 A1 | 2/2005 | Jeon | |
| 2005/0091120 A1* | 4/2005 | Auletta | 705/26 |
| 2005/0131761 A1 | 6/2005 | Trika et al. | |
| 2005/0197927 A1* | 9/2005 | Martineau et al. | 705/27 |
| 2005/0246196 A1 | 11/2005 | Frantz et al. | |
| 2005/0273392 A1 | 12/2005 | Ahn | |
| 2006/0011728 A1 | 1/2006 | Frantz et al. | |
| 2006/0016884 A1 | 1/2006 | Block et al. | |
| 2006/0026070 A1 | 2/2006 | Sun | |
| 2006/0036491 A1 | 2/2006 | Leung et al. | |
| 2006/0085260 A1 | 4/2006 | Yamagishi | |
| 2006/0111967 A1 | 5/2006 | Forbes | |
| 2006/0149628 A1 | 7/2006 | Chefalas et al. | |
| 2006/0178932 A1 | 8/2006 | Lang | |
| 2006/0235748 A1* | 10/2006 | Gordon et al. | 705/14 |
| 2006/0265281 A1 | 11/2006 | Sprovieri et al. | |
| 2006/0271460 A1* | 11/2006 | Hanif | 705/35 |
| 2007/0063842 A1 | 3/2007 | Sprogis | |
| 2007/0088610 A1 | 4/2007 | Chen | |
| 2007/0121843 A1* | 5/2007 | Atazky et al. | 379/114.13 |
| 2007/0150339 A1 | 6/2007 | Retter et al. | |
| 2007/0156513 A1 | 7/2007 | Mastrianni et al. | |
| 2007/0156517 A1 | 7/2007 | Kaplan et al. | |
| 2007/0203788 A1* | 8/2007 | Andalib et al. | 705/14 |
| 2007/0270125 A1 | 11/2007 | Pousti | |
| 2008/0099551 A1* | 5/2008 | Harper et al. | 235/380 |
| 2008/0109316 A1* | 5/2008 | Pandhe | 705/14 |
| 2008/0172306 A1* | 7/2008 | Schorr et al. | 705/26 |
| 2008/0189189 A1* | 8/2008 | Morgenstern | 705/26 |
| 2008/0208742 A1* | 8/2008 | Arthur et al. | 705/41 |
| 2008/0243705 A1* | 10/2008 | Paintin | 705/78 |
| 2008/0255942 A1* | 10/2008 | Craft | 705/14 |
| 2009/0089177 A1* | 4/2009 | Dayton et al. | 705/26 |
| 2009/0094134 A1* | 4/2009 | Toomer et al. | 705/26 |

FOREIGN PATENT DOCUMENTS

| | | |
|---|---|---|
| KR | 10-2003-038349 | 5/2003 |
| KR | 10-2003-038351 | 5/2003 |
| KR | 10-2003-084000 | 11/2003 |
| KR | 10-2004-003750 | 1/2004 |
| KR | 10-2004-010092 | 1/2004 |
| KR | 10-2004-091822 | 11/2004 |
| KR | 10-2005-019310 | 3/2005 |
| KR | 10-2005-083178 | 8/2005 |
| WO | WO 0003328 | 1/2000 |

* cited by examiner

INTEGRATION OF GIFT CARD SERVICES FOR MOBILE DEVICES AND SOCIAL NETWORKING SERVICES

BACKGROUND

The present disclosure relates to data processing by digital computer, and more particularly to integration of social networking services and gift card services for mobile devices.

Gift cards may provide a form of payment for a particular merchant that may be used at a point of sales. For example, a clothing retailer may issue plastic gift cards that include magnetic strips similar to credit cards, where the gift cards are associated with credit to pay for purchases. A shopper may buy a gift card from the retailer and give it to a friend. Then, the friend may try to purchase clothing from the retailer by using the gift card, where the gift card may be swiped through a point of sales terminal similar to swiping of a credit card. At the retailer, backend systems may determine whether a sufficient amount of credit exists for the gift card and the purchase may be wholly or partially paid by credit associated with the gift card.

Social networking services allow for members of their services to interact with each other and build communities of people. Social networking services may be built on a web-based platform where a user of a computer may use a web browser to interact with profiles of members, where the interaction may include sending instant messages, posting text or pictures to a board or blog of messages, and the like.

SUMMARY

The subject matter disclosed herein provides methods and apparatus, including computer program products, that implement techniques related to integration of social networking services and gift card services for mobile devices.

In one general aspect, a profile of a member of a social networking service is presented with one or more merchant credit services for prepaid merchant account credit, data characterizing a request to provide a first credit service from the merchant credit services and a mobile phone number associated with an intended recipient of the first credit service is received, and a message is caused to be sent to the mobile phone number, where the message characterizes provision of the first credit service to the intended recipient.

In a related aspect, a profile of a member of a social networking service is presented with a list of one or more merchant credit services for prepaid merchant account credit, where the credit services associate credit with a mobile phone number of an intended recipient of the credit services and provide information related to the credit to a mobile device having the mobile phone number through messages to the mobile phone number. Data characterizing a request for further information regarding a first credit service from the list of the merchant credit services is received, where the data characterizes the request received through an interface presenting the profile of the member with the list of one or more merchant credit services. A loyalty indicator associated with the member is increased in response to the receiving the data characterizing further information regarding the first credit service. The loyalty indicator is associated with an account of the member with the first credit service for loyalty-based services.

In a related aspect, data characterizing a request for merchant credit services is received from a mobile device having a mobile phone number. A message is caused to be sent to a mobile phone number of an intended recipient of the merchant credit services, the message characterizing provision of a first credit service to the intended recipient.

The subject matter may be implemented as, for example, computer program products (e.g., as source code or compiled code tangibly embodied in computer-readable media), computer-implemented methods (e.g., where processes and sub-processes may be performed by computer implements, such as a server computer system), and systems (e.g., computer systems which may include server computer systems and database systems).

Variations may include one or more of the following features.

A loyalty indicator associated with the member of the profile that is presented may be increased in response to receiving the request to provide the first credit service, where the loyalty indicator is associated with an account of the member with the first credit service for loyalty-based services. A loyalty indicator associated with the member may be increased in response to receiving data characterizing further interest in the first credit service, where the loyalty indicator is associated with an account of the member with the first credit service for loyalty-based services.

The first credit service may be added to a list of merchant credit services associated with a profile of an intended recipient.

Data to personalize the message may be received. Causing a message characterizing provision of a merchant credit service to be sent to a mobile device may include personalizing the message in accordance with the data to personalize the message.

Causing a message characterizing provision of a merchant credit service to be sent may include causing the message to be sent to an electronic mail message address of the intended recipient, a social networking message address of the intended recipient, another address, or some combination of addresses.

A message to be sent to a mobile telephone number may be a Short Message Service message or a Multimedia Message Service message.

The message characterizing provision of the first credit service may include information to activate the first credit service.

A credit service may be for a gift card in accordance with an amount specified in the request to provide the credit service.

Receiving data characterizing a request for merchant credit services may include receiving data characterizing a request for a selection of gift cards. A request for a selection of gift cards may be from a mobile device. Receiving data characterizing a request for merchant credit services may further include receiving data characterizing a selected gift card from a list of gift cards, an amount for the selected gift card, and the mobile phone of the intended recipient. Receiving data characterizing a selected gift card may occur after data characterizing the list of gift cards corresponding to retailers is sent to a mobile device. A request for merchant credit services from a mobile device may be from a client application of the mobile device that is used to store and manage gift cards (e.g., a Binary Runtime Environment For Wireless, MICROSOFT WINDOWS MOBILE, or JAVA 2 PLATFORM, MICRO EDITION application) or a Wireless Application Protocol (WAP) browser (which may read Wireless Markup Language pages served by a server, and the pages may be linked by a WAP Uniform Resource Locator sent to a mobile device). The request for services may be handled by a server, such as a gift card server.

The subject matter described herein can be implemented to realize one or more of the following advantages. Merchants may be allowed to deliver gift cards via mobile networks (e.g., cellular networks) using carrier-agnostic technology (e.g., SMS (Short Message Service)/MMS (Multimedia Messaging Service) or another delivery protocol). For example, a gift card may be purchased in a web browser via a web service, and, a merchant (e.g., an entity that provides goods, services, or both, such as STARBUCKS, MCDONALDS, HOME DEPOT, NORDSTROM, and the like) may deliver information pertaining to the gift card to a mobile device, such as a cellular phone. Providing gift cards to wireless devices may allow for quick and easy transfer of gift cards from a gifter to a recipient, allow for wireless account balance information, and allow for gift card information to be easily carried with a mobile device (e.g., as people may carry a mobile device often, as opposed to gift cards, and, multiple gift card accounts may be easily carried on a wireless device instead of with many physical cards). The gift cards and related services may operate without the use of a client-side application at the mobile device other than a messaging service application provided by a carrier of mobile services with the mobile device, which may advantageously make acceptance and use of wireless gift cards more simple. The wireless gift cards may be authenticated during activation, settlement of transactions, and the like, where authentication may include, as examples, caller identification and personal codes associated with wireless gift cards. Value of the wireless gift cards may be increased (e.g., through returns of merchandise or payment for additional merchant credit), which may advantageously retain customers of a merchant. Multiple gift cards may be managed simultaneously from a same account (e.g., through a web site). Value may be moved from a wireless gift card to a physical gift card. For example, if a merchant wants to only allow redemption of cards at a point of sales via plastic cards, yet desires an ability to deliver card values wirelessly, card value may be tied to a mobile phone number and transferred to a physical, plastic gift card. A wireless gift card may be personalized by themes, text messages, audio, images, video, and the like. The wireless gift cards may be tracked and used as a customer loyalty system which may allow for sending of promotions and the like. A wireless gift card may be used as a data mining opportunity for a merchant and an opportunity for delivering promotional content. For example, gift card usage may be tracked and promotions may be sent to a mobile device based on usage. In contrast to physical gift cards which might not be tied to a same customer, as wireless gift cards are associated with a same mobile phone number, a longer history of tracking customer trends may be possible (e.g., as a customer switches from one wireless gift card to another their purchasing trends may be tied to a same account by a same mobile phone number). Thus, a collection of features may allow for a merchant to generate an ongoing, interactive experience with customers. The wireless gift cards may be integrated with social networking services, loyalty-based services, or both. The integration of the services may provide an opportunity for members of social networking services to associate themselves with wireless gift cards and may provide an opportunity users of social networking services to learn more about the gift cards from profiles of users and purchase wireless gift cards in which they know a member will be interested. In addition, an integration with loyalty-based services may allow for members of social networking services to benefit from associating themselves with social networking services as, for example, they may gain rewards in return for interest in the gift cards that originate from their social networking profile. Information derived from tracking interest in wireless gift cards may be mined to find information that may be used for advertising. For example, based on retail sectors of wireless gift cards received in the past advertising may be targeted to a specific range of goods and services fitting those retail sectors.

Details of one or more implementations are set forth in the accompanying drawings and in the description below. Further features, aspects, and advantages will become apparent from the description, the drawings, and the claims.

BRIEF DESCRIPTION OF THE DRAWINGS

FIGS. 3A-3B are diagrams illustrating user interfaces for managing wireless gift cards.

DETAILED DESCRIPTION

In general, with reference to the descriptions of FIGS. 1-7, gift cards may be referred to as wireless gift cards or "WGIFTCARDS," as the gift cards may be delivered via wireless networks. A physical (e.g., plastic) gift card might not be issued and, instead, information pertaining to the wireless gift card, such as a gift card number may be delivered via wireless networks. Wireless gift cards may exist in addition to existing physical gift cards or, wireless gift card balance may be tied or transferred to a physical gift card.

Services offered in connection with gift cards may be referred to as merchant credit services. Merchant credit services may include gift cards; other forms of payment based on merchant credit, such as electronic cards that hold store credit; loyalty programs associated with gift cards; and the like. Thus, wireless gift cards may be used to perform transactions, such as purchasing goods or services, receiving credit from returned purchases, and the like.

In general, a wireless gift card is purchased by a person who may be referred to as a gifter or purchaser, and is designated for sending to an intended recipient. The phrase "intended recipient" may be used interchangeably to refer to a mobile phone number associated with a person and a mobile device, the person, or the mobile device.

In general, a social networking service may include services for presenting profiles of members of the services. Additional services, such as messaging (e.g., sending messages across profiles to an inbox associated with an account managed by a social networking service, instant messaging across profiles, chat, anonymizing electronic mail messages (i.e., allowing electronic mail traffic to be sent through addresses that may cause a message to be forwarded to an actual electronic mailing addresses of a recipient that is hidden from other users), and the like), editing of profiles (e.g., modifying text, pictures, video, and other media; modifying themes; and the like), bulletin boards, and the like may be offered as part of a social networking service. Social networking services may be web-based but need not be, or may include other techniques or mechanisms for access. For example, a web-based social networking service may have an accompanying mechanism for being accessed through a mobile device. Examples of web-based social networking services include FACEBOOK, MYSPACE, LINKEDIN, CLASSMATES.COM, YAHOO! PERSONALS, the Temple of VTEC, e90post.com, and AMAZON.COM (including social networking services provided through AMAZON. COM's profile pages).

Figure 1A:
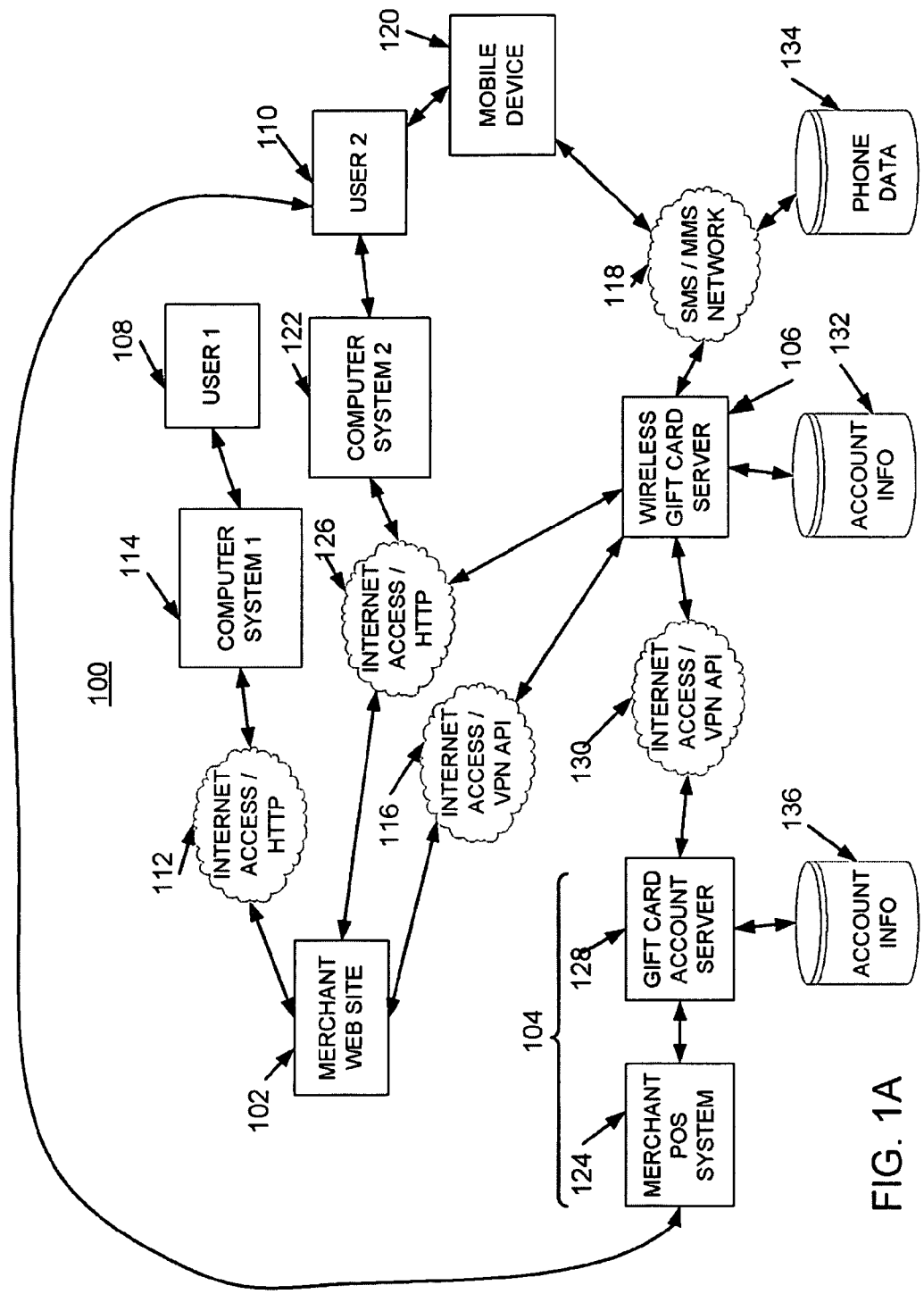
FIG. 1A is a block diagram of a system for mobile device gift card services that includes a merchant web site, merchant gift card point of sales system, and a wireless gift card server.

FIG. 1A is a block diagram of a system 100 for wireless gift card services that includes a merchant web site 102, merchant gift card point of sales system 104, and a wireless gift card server 106. In general, the system 100 may be used by a first user 108 to cause a wireless gift card to be sent to the second user 110 and to allow the second user 110 to complete transactions using the wireless gift card. To cause a wireless gift card to be sent to the second user 110, the first user 108 may access the merchant web site 102 through the internet access 112 from the first computer system 114 to purchase a wireless gift card. Then, the merchant web site 102 may contact the wireless gift card server 106 through the internet access 116 to cause a wireless gift card to be generated at the wireless gift card server 106, which may send a wireless gift card as a message through the SMS (Short Message Service)/MMS (Multimedia Messaging Service) network 118 to the mobile device 120.

The second user 110 may complete transactions using a wireless gift card from a second computer system 122 or from a merchant point of sales system 124. From the second computer system 122, the second user 110 may connect to the merchant web site 102 through the internet access 126 to purchase goods or services online. From the merchant point of sales system 124, the second user 110 may use a wireless gift card to purchase goods or services at a physical store, also referred to as a brick and mortar store. From the merchant web site 102, a transaction may be completed through internet access 116 to the wireless gift card server 106 to settle accounts at the wireless gift card server 106 and a gift card account server 128 of the merchant through application programming interface (API) calls through an internet access 130 supporting virtual private networking (VPN). From the merchant point of sales system 124, a transaction may be completed by settling accounts with the gift card account server 128 and the wireless gift card server 106 by API calls through the internet access 130.

The first and second computer systems 114, 122 may be any type of computer system, such as a personal computer system, which may include a desktop or laptop computer. The first and second computer systems 114, 122 may have wired or wireless internet access 112, 126. The internet access 114, 122 of the first and second computer systems 114, 122 includes HTTP (HyperText Transfer Protocol) and may include other protocols as well. For example, the first computer system may use HTTPS (HTTP Secure) to complete a credit card transaction to pay for a wireless gift card at the merchant web site 102. In general, the first and second computer systems may use a web browser (e.g., INTERNET EXPLORER, FIREFOX, NETSCAPE, AMERICAN ONLINE, and the like) to interpret content, such as web pages, from the merchant web site 102.

Figure 2A:
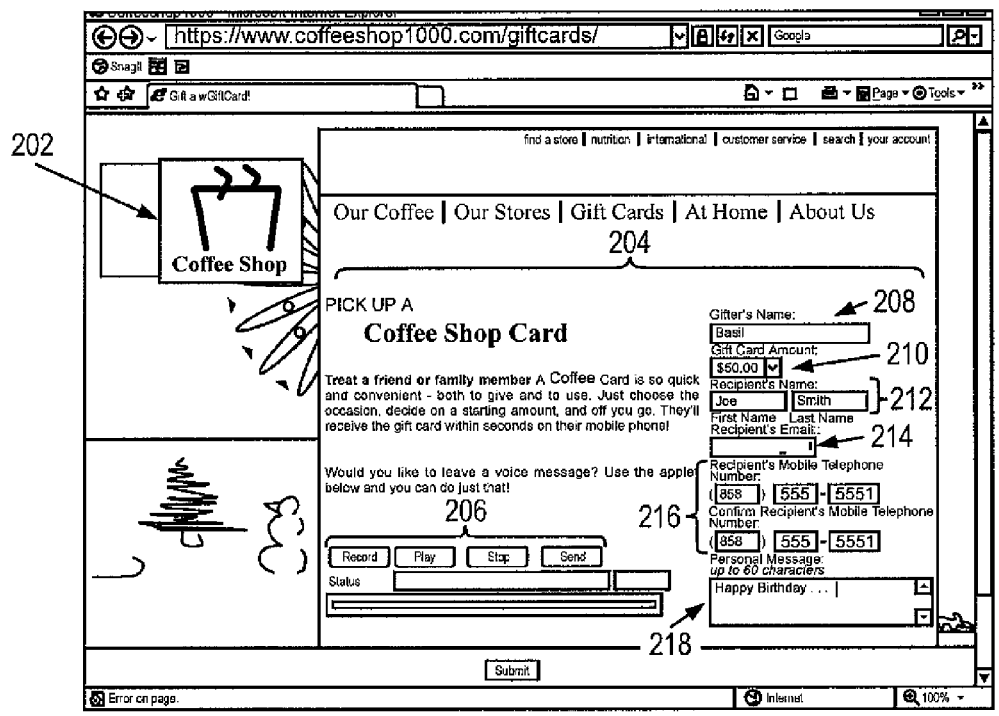
FIG. 2A is a diagram illustrating a user interface from which to request a wireless gift card.

The merchant web site 102 is a web site maintained by a merchant who may offer wireless gift cards for sale, and other goods or services for sale. In general, a merchant is a provider of goods, services, or both. An example user interface of a merchant web site is illustrated in FIG. 2A. As part of a process of purchasing a wireless gift card at the merchant web site 102, a user may be allowed to personalize a wireless gift card. Personalizations that may be supported at the merchant web site 102 may include text and multimedia, such as images, audio, video, or any combination of text and multimedia. As part of personalization, merchants may provide themes, personal messages, and the like for a wireless gift card. For example, a wireless gift card may be provided in an MMS message that includes a personal message wishing a person a happy birthday, and the message may include pictures and formatting intended to provide a birthday theme (e.g., background wallpaper, color, font and images for types of wireless gift card to display, such as a picture of balloons for a birthday). For example, themes may be provided via default templates that can be selected via a web browser, such as themes for birthdays, anniversaries, graduations, and the like. In addition, merchant advertisements may be included in a wireless gift card. Wireless gift cards that are personalized with multimedia may be supported by wireless protocols such as MMS while messages personalized solely with text may be supported by SMS.

In addition to including personalizations of a wireless gift card, a wireless gift card may include an account number that may be used at the merchant point of sales system 124 or the merchant web site 102 to complete transactions. The account number may be the same as or different from an account number used to identify a gift card in the gift card account information database 136 of the gift card account server 128. In addition to an account number, a wireless gift card may include an amount of a wireless gift card. Also, the wireless gift card may include a bar code representing the number which may be scanned at the merchant point of sales system 124. A bar code may only be included where a feature set of the mobile device 120 includes support for bar codes, which may be limited, as examples, to mobile devices that include support for MMS messaging or farther refined to mobile devices that support display of images of a sufficient quality for bar code scanning (e.g., some mobile devices may support MMS messaging but a reproduction quality of a bar code on the mobile devices might not be sufficient for supporting scanning of a bar code such that a bar code might not be sent to such a device, which may advantageously avoid confusion or problems related to attempting to scan a bar code from such a device).

As described above, bar code technology may be used through the use of a display of a mobile device. In addition or alternatively, a wireless gift card may use other types of technology available in the handset. As examples, RFID (Radio Frequency IDentification), BLUETOOTH, LBS (Location Based Services), or other technology may be used to transfer authentication information to a point of sales system which may then be transferred to a gift card system. For example if RFID readers can read a handset that gives off a unique identification code, that unique identification code may be used and correlated with a gift card account number and a barcode need not to be displayed at a point of sale system.

In some implementations, in addition to sending a wireless gift card to a mobile device, a wireless gift card may be sent to an address other than a mobile phone number, which may allow for personalizations to be viewed from a computer system. For example, wireless gift cards may be sent to an electronic mail address in accordance with SMTP (Simple Mail Transfer Protocol), or to a user message account of a social networking web site. In some implementations, a message sent to an intended recipient of a wireless gift card may include a link to a wireless gift card (e.g., included in an SMS message for use through a WAP (Wireless Application Protocol) or HTTP-enabled browser of a mobile device).

While the merchant web site may accept purchase of and personalizations to, wireless gift cards, the wireless gift cards and related messages may be generated by the wireless gift card server 106 in concert with the SMS/MMS network 118. For example, the merchant web site 102 may accept an order for a wireless gift card, which may be sent to the wireless gift card server 106, which may generate an account at the account information database 132, and cause a message to be generated through the SMS/MMS network 118.

The SMS/MMS network 118 may be one or more wireless carriers that provide mobile data services for mobile devices, such as the mobile device 120. Messages generated for the SMS/MMS network may be generated by messages from the wireless gift card server 106. For example, a carrier may provide an API for generating SMS and MMS messages, and the wireless gift card server 106 may generate a message in accordance with the API which is sent by an API call to the SMS/MMS network 118 which causes a message to be sent to the mobile device 120.

To send appropriate features of messages to appropriate devices, the SMS/MMS network 118 includes a phone data database 134, which may include data that relates phone numbers to phone models and phone features. For example, the wireless gift card server 106 may query a carrier of the SMS/MMS network 118 for a feature set of a mobile device having a phone number of an intended recipient of a wireless gift card. Then, the SMS/MMS network 118 may perform a look up of the phone data database 134 to determine which features are supported by the phone and a set of features may be returned to the wireless gift card server 106. Then, based on the features supported by the mobile device, the wireless gift card server 106 may generate an appropriate message that includes those features supported by the device. For example, a mobile device may support only SMS messages in which case the wireless gift card server 106 may generate an SMS message instead of an MMS message including photos and music that was selected by a gifter, and cause the SMS message to be transmitted through the SMS/MMS network 118. As another example, a mobile device may support MMS messages in which case an MMS message is generated by the wireless gift card server 106 and caused to be transmitted through the SMS/MMS network 118. In some implementations, feature sets of a mobile device associated with a mobile phone number may be split across lookups in different databases. For example, the phone data database 134 may be able to respond to queries of a mobile device model associated with a mobile phone number, however it might not respond with a feature set or the set of features might not be appropriate for the wireless gift card server 106. Based on a mobile device model, the wireless gift card server 106 may have a set of features and preferences for mobile device models that are used when generating a wireless gift card. As another example, if a user of a mobile device has not subscribed to any messaging services, the wireless gift card server might not generate a message in that scenario and may instead send a message to an electronic mail address including a wireless gift card.

Although a granularity of features may include SMS and MMS support, further granularity and types of features may be detailed and support to adapt messages to those features may be provided. For example, although a phone may accept MMS messages, it may only accept certain types of audio files, such that a format of an audio file included in a wireless gift card may be tailored to a type of audio format supported by a mobile device.

The types of information included in a database of features may include handset characteristics such as screen type (e.g., for barcodes, such as whether barcodes are supported, or properties of a screen, such as a size from which barcode support may be determined), if the handset supports RFID, LBS, BLUETOOTH, or an ability to download and run executable programs (e.g., BREW (Binary Runtime Environment For Wireless), J2ME (JAVA 2 PLATFORM, MICRO EDITION), or MICROSOFT WINDOWS MOBILE support).

The mobile device 120 may be mobile phone, personal digital assistant, and the like. In general, the mobile device 120 is associated with a mobile phone number that may be used to send data messages to the mobile device 120 and may be used to make phone calls. The mobile device 120 may support SMS messaging, MMS messaging, other protocols, or a combination of protocols. Messages in accordance with a protocol may be handled by an application of the mobile device that is provided as a default application for supporting the protocol. Advantageously, wireless gift cards may be accepted without requiring a new client application to be provided to the mobile device 120. In addition, as wireless gift cards may be sent using SMS, MMS, or both, the wireless gift cards may be carrier and device agnostic, which may provide predictable acceptance of wireless gift cards on the mobile device 120 (e.g., with an exception for carriers disabling data messaging without a service subscription), allow for carriers to not approve new client applications, and allow for purchasers of wireless gift cards to not be cognizant of a carrier or platform of an intended recipient. For example, the mobile device 102 may receive and store wireless gift cards in a similar fashion as other SMS or MMS messages.

When purchasing a wireless gift card, the merchant web site 102 contacts the wireless gift card server 106 to generate the wireless gift card message, as described above. In addition to generating the message, the wireless gift card server 106 may generate an account in the account information database 132 associated with the wireless gift card server 106. The account may include information related to a wireless gift card, such as a mobile phone number of an intended recipient, an account number of a wireless gift card (e.g., an account number that may be used at the merchant point of sales system 124 to identify a wireless gift card to be used for a transaction), a phone feature set of an intended recipient (e.g., support of bar codes, RFID, LBS, BLUETOOTH, BREW, J2ME, and the like), a purchaser of a wireless gift card, personalization information related to a wireless gift card (e.g., a text message or a voice recording), a security code (e.g., a PIN (personal identification number)) associated with a wireless gift card, notification preferences, associations among the combinations of information, and the like.

In some implementations, multiple wireless gift cards may be associated with a same mobile phone number, while each wireless gift card has a separate account number. In those implementations, a single account may exist that organizes all of the wireless gift cards together or there may be separate accounts that may be organized by a query to for a list of wireless gift cards associated with a mobile phone number. Where there is a single account for multiple wireless gift cards, account preferences and account information may be applied uniformly across all wireless gift cards associated with the account. For example, a PIN may be associated with an account for use in managing wireless gift cards at the wireless gift card server 106, and notification preferences for transactions performed with wireless gift cards may be applied uniformly across all wireless gift cards associated with the account.

In addition to the wireless gift card server 106 generating account information for a wireless gift card, the wireless gift card server 106 may contact the gift card account server 128 through API calls 130 to generate a gift card account at a merchant point of sales gift card system 104. The merchant point of sales gift card system 104 may be separate from the wireless gift card server 106 as the merchant point of sales gift card system 104 may be a legacy system used for physical gift cards that may be connected with the wireless gift card server 106 to add wireless gift card support. The gift card account server 128 may hold master account balance records in the account information database 136. For example, when generating a wireless gift card, the wireless gift card server 106 may contact the gift card account server 128 to generate a gift card account as it would for a physical gift card and that account may be used to maintain a master balance for a wireless gift card, while the wireless gift card server account information database 132 may be used to hold other information used for providing wireless gift card services that differ from a physical gift card system (e.g., as a mobile phone number used for sending a wireless gift card is not associated with a physical gift card).

By having the gift card account server 128 act as a holder of master records for account balance, a wireless gift card may be used at a merchant point of sales system 124 or through a merchant web site 102, and an account balance may be kept consistent and current. In addition, wireless gift cards may be used at a merchant point of sales system 124 with few, if any, modifications to the gift card point of sales system 104. For example, the merchant point of sales system 124 need not contact the wireless gift card server 106 to update it as to account changes at the gift card account server 128. In some implementations, an account balance may be synchronized across various account balance servers (e.g., one for brick and mortar sales and one for web site sales). In addition to holding account balances, other information may be maintained at the gift card account server 128, such as an authorization code associated with a gift card account.

The wireless gift card server 106 may be hardware, software, or both, that includes an application programming interface ("API"), web service, and user interface (e.g., a LINUX or MICROSOFT WINDOWS web server with HTTP and HTTPS web services). In addition to causing messages to be sent, the wireless gift card server 106 may cause messages to be received from a mobile device. Messages that may be received and serviced by the server may include, as an example, requests for balance information. To cause messages to be sent to a mobile device, the server may interface with servers of mobile carriers (e.g., through the SMS/MMS network 118, as described above). An API of the server or other means of command interface may be implemented as XML (eXtensible Markup Language) over HTTP (also referred to as SOAP, Simple Object Access Protocol); embedded objects, such as COM (Component Object Model) or JAVA references; a non-standard command protocol over TCP (Transmission Control Protocol; e.g., Telnet); or using a standard delivery method, such as SMTP (Simple Mail Transfer Protocol), used in electronic mail.

For example, an API that a merchant may interface with to provide a web service through a user interface that is transferred to a user of a web browser for display and interaction. The API may provide a way for a merchant to interface accounting of gift card information to the wireless gift card server 106. As an example, from a merchant web site/shopping cart, a new gift card may be issued for a phone number X with balance of Y through an API call to the wireless gift card server 106. The wireless gift card server 106 may, in response, cause a message to be sent to the mobile device 120 with phone number X. In addition, an existing gift card accounting system may be used to associate the balance Y with the account number. As another example, from a merchant web site/shopping cart, a physical gift card may be turned into a wireless gift card linked to a phone number X. As another example, from the merchant point of sale system 124, an account number Z may be updated with a new balance of Y.

While wireless gift cards may be activated once they are sent, in implementations, activation may be a required process of receipt of a wireless gift card. For example, a user may receive a wireless gift card and may be invited to call a wireless gift card IVR (interactive voice response) system to activate a wireless gift card.

Authentication techniques, mechanisms, or both may be involved in provision and use of wireless gift cards. One technique may involve the use of authorization codes which may be referred to as "secret" PINs, which may be used in conjunction with wireless gift cards by allowing users (e.g., a recipient or sender of a wireless gift card) to set a secret PIN. A PIN may be set up as part of an initial process of activating a wireless gift card. For example, an intended recipient of a wireless gift card may first receive a personalized message informing them they have received merchant credit and an invitation to call a phone number to activate the wireless gift card. Then, authentication for setting up a PIN may be handled by caller identification of a mobile device and an intended recipient (e.g., making sure a phone number associated with a wireless gift card is the phone number dialing to set up a PIN).

PINs may be set up using a combination of techniques and mechanisms, such as an IVR system, short code numbers, and the like. For example, a user may be able to dial into a system to set up a PIN via a voice network and touch tone dialing the PIN via a key pad (e.g., a mobile phone key pad). As another example, a PIN may be setup and then used by a recipient by replying to a wireless gift card short code number (e.g., to dial the wireless gift card system) after receiving the wireless gift card. For example, a wireless gift card may be received by a mobile phone from a short code #12345. The recipient may call the short code #12345 with a voice call and the call may be routed to a voice system to setup a PIN similar to credit cards and ATM (automated teller machine) bank cards.

Multiple wireless gift cards associated with a same mobile phone number may use a same PIN that a recipient sets up, or, separate PINs may be supported and used for separate wireless gift cards. PINs may be changed by a user at a later time (e.g., by managing a wireless gift card at a web site or by calling a number used to set up the PIN).

A PIN may be associated with the wireless gift card to enhance security of wireless gift cards by being required during management of a wireless gift card, completion of transactions involving a wireless gift card, and the like. For example, to log on a web site that allows for management of a wireless gift card, a user may use a combination of a mobile phone number associated with a wireless gift card and a PIN.

In some implementations, a PIN may be set up by a user other than an intended recipient or automatically by the system 100. For example, a person ordering a wireless gift card may enter a PIN and the wireless gift card may be associated with the wireless gift card at a system for managing wireless gift cards. Then, a recipient of the wireless gift card may be given both the wireless gift card and PIN, either separately or together, and, the PIN may be required to complete a transaction with the wireless gift card (e.g., such that an automated number generator alone is unlikely to allow an unauthorized user to complete a wireless gift card transaction).

In addition to or separate from a PIN, other types of information may be associated with a wireless gift card to enhance authentication of a user trying to complete a transaction with a wireless gift card. For example, a name of a recipient may be used (e.g., which may be checked against a photo identification presented by a user at a brick and mortar retail store), an alphanumeric password (e.g., "Goofy24"), or a mobile phone number of a recipient (e.g., which may be checked against a mobile phone number associated with the wireless gift card, or further verified by sending an SMS to a recipient while at a retailer and verifying the contents of the SMS or the receipt of the SMS).

Authentication information, such as a PIN may be used to redeem a wireless gift card. For example a user may be able to enter authentication information in a PIN keypad of the merchant point of sales system 124. As another example, a recipient may be able to use a mobile phone to dial a number associated with wireless gift cards, for example to enter authentication information (e.g., through the mobile phone keypad or by voice prompt), and the authentication information provided by the user may be checked against authentication information associated with the wireless gift card. Then, a window of time may be provided during which a user may use a wireless gift card (e.g., a thirty minute interval, which may be renewed by authenticating the wireless gift card again).

As an example of using photo identification verification, photo identification may be matched with a name associated with a wireless gift card (e.g., a name in a wireless gift card message on a mobile device or a name that appears on the merchant point of sales system 124 in response to entering an account number of a wireless gift card). Use of photo identification may be advantageous if the merchant point of sales system 124 does not have the ability to check for authentication (e.g., a keypad is not provided for a user).

As another example of authentication during redemption, a keypad on a mobile device (or other user interface, such as a touch screen) held by a wireless gift card recipient may be used for authentication of wireless gift card in combination with authentication information and caller identification. For example, authentication to the system 100 may be determined by the wireless gift card account number being used, the caller identification from the phone which is tied to the wireless gift card, and a secret PIN known by the recipient. A window can be used to "pre-authorize" transactions within a set time period (e.g., 10-30 minute window), or similar to use of a point of sale system that has a keypad, the point of sale system (e.g., a system without the keypad) may wait as a purchaser uses their mobile phone to enter in the PIN to authenticate a transaction.

As another example of authenticating a wireless gift card, a merchant may check to see that a wireless gift card is from a short code associated with wireless gift cards (e.g., a five or six digit sender number used by a carrier for carrier-based services). By visually identifying the short code, and, due to a challenge associated with counterfeiting short codes (e.g., they may be internal to a carrier and short code messages may only be relayed by the carrier), this may provide a degree of authentication.

Authentication may be assisted by the wireless gift card server 106, the gift card account server 128, both or neither. For example, a PIN entered at a keypad of the merchant point of sales system 124 may be checked against a PIN associated with a wireless gift card at the wireless gift card server 106 (e.g., the merchant point of sales system 124 may send a request for authorization to the gift card account server 128, which may identify a gift card account as being a wireless gift card account and may send a further request for authorization to the wireless gift card server 106 which may attempt to match a PIN entered at the merchant point of sales system 124 with a PIN associated with a wireless gift card account).

In addition to generating messages for wireless gift cards, the wireless gift card server 106 may be used to provide other services related to wireless gift cards, such as notifications, management of wireless gift cards, and other features. Notifications may include notifications of receipt of wireless gift cards, transaction notification, promotions, and the like. Notifications may be set automatically (e.g., as a default action), set by the recipient, or set by the sender of a wireless gift card. Notifications may be set up at a web site, such as a web site of the wireless gift card server 106 or the merchant web site 102; set by a message sent by the mobile device 102, or through another mechanism. For example, a recipient of a wireless gift card may send an SMS reply message to the gift card server (or, e.g., sending a new SMS to the short code of the gift card server) and including text such as "NOTIFY" to start notifications or "NOTIFY OFF" to turn off notifications.

As an example of transaction notifications, a sender or recipient of a wireless gift card might be able to sign up to receive a message at a mobile device to indicate a transaction has taken place. This may be used for security purposes, to provide a receipt, to provide updated balances, and the like. For example, a recipient of a wireless gift card receiving a transaction notification may be able to contact the wireless gift card vendor if an unauthorized transaction has taken place (e.g., then fraud resolution procedures may be followed to resolve an unauthorized transaction; e.g., if a mobile phone number is associated with a completed transaction, that number may be used by authorities to track down an unauthorized user of a wireless gift card). As another example, when a change in balance occurs within an account, a new SMS or MMS message may be sent for a receipt with updated balance information.

As an example of a type of notification other than a transaction notification, if wireless gift cards have an expiration period, notifications may be associated with an expiration of a wireless gift card to allow a recipient ample time to use the wireless gift card before the expiration (e.g., sending a notification one week before expiration). As another example, special deals or offers may be associated with a wireless gift card and may be sent to a recipient. For example, a retailer may decide to offer a special promotion in conjunction with use of a wireless gift card (e.g., 20% off on a particular weekend) and the retailer may send a notification of the promotion to wireless gift card recipients.

Notification may be provided by one or more of multiple techniques, mechanisms, or both. For example, notifications may be by mobile messaging services (e.g., SMS or MMS), electronic mail, and the like. Notifications may be managed, for example, at a web site for management of wireless gift cards that may be a feature of the wireless gift card server 106.

In addition to providing for management of notifications, the wireless gift card server 106 may provide other features for management of aspects of wireless gift cards, all of which may be managed at a web site. Management of wireless gift cards may be limited to management by an intended recipient, or a purchaser of a wireless gift card may be given limited management capabilities (e.g., tracking to ensure a wireless gift card has been received and activated). Other features that may be provided for management of wireless gift cards may include transferring wireless gift cards to an intended recipient, aggregating value of wireless gift cards (across a same or different merchants), and the like.

Transfers of wireless gift cards to other recipients may be performed as a complete transfer of a wireless gift card or to allow another individual to use a wireless gift card (e.g., re-gifting of wireless gift cards or giving it to another person, such as a spouse, to use). Transfers may be initiated through messaging services of mobile devices or through a web site. To ensure a transferred wireless gift card is authentic, a wireless gift card that is transferred through a mobile device may be required to be authenticated. As an example of an authentication required of a wireless gift card, a wireless gift card may be required to be sent from a wireless gift card short code, such that transferring a wireless gift card may involve sending a message to a wireless gift card server to cause a message from the wireless gift card short code to be generated and sent to a new recipient of the wireless gift card. To authenticate a user, a sender's caller identification of the message may be checked and the sender may be required to enter authentication information (e.g., enter their PIN in a message or by calling an IVR system). As an example of a process of transferring a wireless gift card, a wireless gift card recipient may send a text message (e.g., SMS) to a short code associated with the wireless gift card server with certain key words and a sequence of those key words to cause the transfer. For example, an SMS with key words and sequence "GIFTON<ACC#>TO<NEW_MOBILE_NUM>" may gift a wireless gift card with the wireless gift card account number in the "<ACC#>" to the mobile number in the "<NEW_MOBILE_NUM>". A server (e.g., the wireless gift card server 106) receiving the message may authenticate a user (e.g., through caller identification of a message sent, by entering authentication information, or both) and cause the mobile number associated with the wireless gift card to be disassociated with the account number and associate the new mobile number with the account number.

A web site for managing wireless gift cards may include authentication as part of the process of logging in (e.g., using a combination of two or more of a mobile phone number, a wireless gift card account number, a PIN, and the like). For example, a recipient may log on to a web site to manage the wireless gift card and cause a transfer of the wireless gift card by entering in a phone number of a new recipient and the number may be used to updated a mobile number associated with the wireless gift card and to send the wireless gift card to the new recipient from the short code.

Transferring of a wireless gift card may involve sending personalized information, as well. For example, wireless gift cards may be re-gifted using the transferring service through a web site for managing wireless gift cards and a new message including new personalization information may be used.

A feature that may be offered by the wireless gift card server 106 may include allowing for requests of balances by a mobile device. For example, a reply to a wireless gift card with a keyword "BAL" in an SMS message may result in a responsive message that includes a balance of the wireless gift card. A balance request may result in a look up of a phone number and a return of multiple wireless gift card balances or a single wireless gift card balance. A balance response message may include a list of merchants, account numbers, and balance amounts.

Management of wireless gift cards may further include organizing wireless gift cards from different accounts, as a same cell phone number may be associated with each gift card account, or each wireless gift card, and a web site may be provide from which various accounts may be aggregated by a phone number. This may be completely transparent to a merchant and allow brands to remain separate, but may provide the recipient with an ability to manage the wireless gift cards at a central location. For example, similar to a physical wallet with different cards inside. A recipient need not do anything to consolidate cards, as described above, as the phone number may be linked to each account automatically (e.g., an association may be generated each time a wireless gift card is issued and the associations may be centrally processed such that a single phone number record includes multiple wireless gift cards; or, multiple associations with a single phone number from different records may be aggregated at a single source).

As described above, a wireless gift card may be used to complete a transaction at the merchant point of sales system 124 or at the merchant web site 102. A wireless gift card may include an account number that may be entered at the merchant point of sales system 124. For example, when a recipient wants to redeem credit for a wireless gift card, they may present a wireless gift card account number at a merchant storefront (e.g., a physical store, such as a GAP retail store location, or a web site store, such as GAP's web site; e.g., to redeem for goods, services, or both). At a physical storefront, a cashier may enter in the number to deduct the amount from the account as with any other standard gift card (e.g., using a standard point-of-sale that accepts gift cards by entry of an account number).

Although not shown in the system 100 of FIG. 1A, many types of features may be supported by the system 100. As an example, there may be multiple wireless gift card servers 106, multiple merchant web sites 102, more than two users, and the like.

As another example, merchants may collect customer data when purchasing and managing wireless gift cards. For example, demographic information may be collected, such as a customer's zip code or an area code of a recipient. That information may be used for demographic analysis. That information may be used to facilitate use of a gift card. For example, a "nearest" store location may be found based on an area code of a recipient and that information may be sent to a recipient.

Information related to wireless gift cards may be tracked. History of use may be maintained as a part of tracking. A merchant may continually tie new wireless gift cards to a same account based on a same mobile phone number such that a history of customer trends that spans multiple wireless gift cards may be monitored and analyzed. For example, after a series of seven purchases across three wireless gift cards where a recipient of the wireless gift cards purchases a latte at a coffee shop between eight and eight thirty in the morning, a merchant may have a trend automatically detected and a promotion or other message may be tied to the trend where, as examples, a user may receive a discount at seven thirty in the morning good towards a latte or a merchant may send a message in response to a balance inquiry that indicates the recipient has sufficient balance for two more lattes.

Rules for marketing campaigns may be generated by a merchant and processed by a wireless gift card server. The server may allow for rules to be based upon numerous metrics including time, location, impressions, balance enquiries, a threshold number of recipients, other properties, or a combination of properties. For example, a rule may be generated for an upcoming concert associated with a brand of a merchant, where all wireless gift cards for that merchant to be sent to recipients in area codes near the concert may include a particular theme. As another example, as part of a rule of a merchant a first thousand recipients of a wireless gift card may receive a wireless gift card including a ten percent discount coupon.

Reports may be based on wireless gift card tracking. For example, custom reports may be generated to give retailers information on customer buying habits and other useful information. For example, a management report may provide a list of average balances held on accounts within a certain location. As another example, a report may be generated of an average amount of transactions for cards over a set period of time.

Sales of wireless gift cards may be based on a reseller business model. For example, value added resellers may have a business structure including card activation and re-load fees (e.g., a wireless gift card reseller receives an agreed activation fee for initial activation and subsequent re-loading by a consumer), transaction fees (e.g., transaction fees or card usage fees that may be obtained by a processor of transactions), personalization fees (e.g., a wireless gift card service may provide for a standard "default" purchasing experience and resellers may receive a portion of a charge for customization services such as audio or video if desired by a consumer), campaign fees (e.g., a standard wireless gift card service provides for delivery of one type of "default" theme to be delivered for all cards; beyond the initial delivery theme, a reseller may charge an impression fee (similar to traditional advertising fees) that may be competitive with mobile marketing impression rates; this model meets mobile marketing industry standards for one-to-one impressions and may be subject to agreed volume discounts and individual customized campaigns beyond a standard tool set available to a merchant), and report fees (e.g., a suite of basic reports may be free and available upon demand to a merchant, including account balances and store activity; additional detail and fully customized reporting may be available upon request).

As another example, a recipient of a physical gift card may request turning a physical gift card to a wireless gift card. For example, a recipient of a physical gift card having account information may go to a wireless gift card web site (e.g., a wireless gift card web site that services gift cards for multiple merchants or a single merchant) and enter in gift card merchant, account number, and phone number information. The wireless gift card server 106 may access the gift card account server 128 merchant's and obtain balance information. The wireless gift card server 106 may send a message with the merchant, account number, and balance information to the recipient.

Similarly, a recipient of a wireless gift card may request activation of a physical gift card from a wireless gift card, which may erase a wireless gift card or link a wireless gift card to the physical gift card. For example, the second user 110 may visit a store, pick up a physical gift card, and call a number or visit the merchant web site 102 to have the wireless gift card associated with an account number of the physical gift card such that transactions may be completed with the physical gift card.

Although the system 100 of FIG. 1A includes a certain number and type of components, implementations may vary in addition to the variations described above. For example, there may be internet access or other network access between the merchant point of sales system 124 and the gift card account server 128. As another example, the merchant web site 102 may host management of purchased wireless gift cards. As another example, wireless gift card replacements may be requested via the merchant web site 102 or a wireless gift card web site offered by the wireless gift card server 106, for example, if a cell phone is lost. For example, a wireless gift card may be associated with a phone number, such that a replacement wireless gift card may be issued to a phone number and appear on a new phone associated with the number.

As another example, there may be an application that runs on a mobile device or through a WAP interface to purchase and manage gift cards. The application may allow for purchasing of wireless gift cards similar to how users may purchase ring-tones for their handsets. For example, a user may scroll through a catalog of gift cards on their handset to select which card they want to purchase. Then, the user may select a gift card type and dollar amount. The funds may be billed to the user via their wireless carrier billing system (which may be similar to how purchasing a ring-tone is billed) or through another system (e.g., credit associated with a mobile phone number, such as a credit card associated with a wireless gift card account or other types of credit). The user may be prompted to enter a phone number or other contact information of an intended recipient. After selecting a retailer for a wireless gift card, an amount, and contact information for an intended recipient, activation may go through a wireless gift card server and the card may be delivered to the appropriate recipient using that contact information. The client application or WAP service may provide a channel to purchase wireless gift cards in addition to, or instead of, a web site that is designed for an internet browser of a personal computer. Social networking services may assist in exposing such an application or service as a purchase point. For example, clicking on a list of a mobile gift card service at a social networking service may result in a link being sent to a mobile device, where the link is to a client application that can be downloaded to a mobile device to purchase gift cards, or a WAP Uniform Resource Locator that may be used to access a WAP service to purchase gift cards.

Figure 1B:
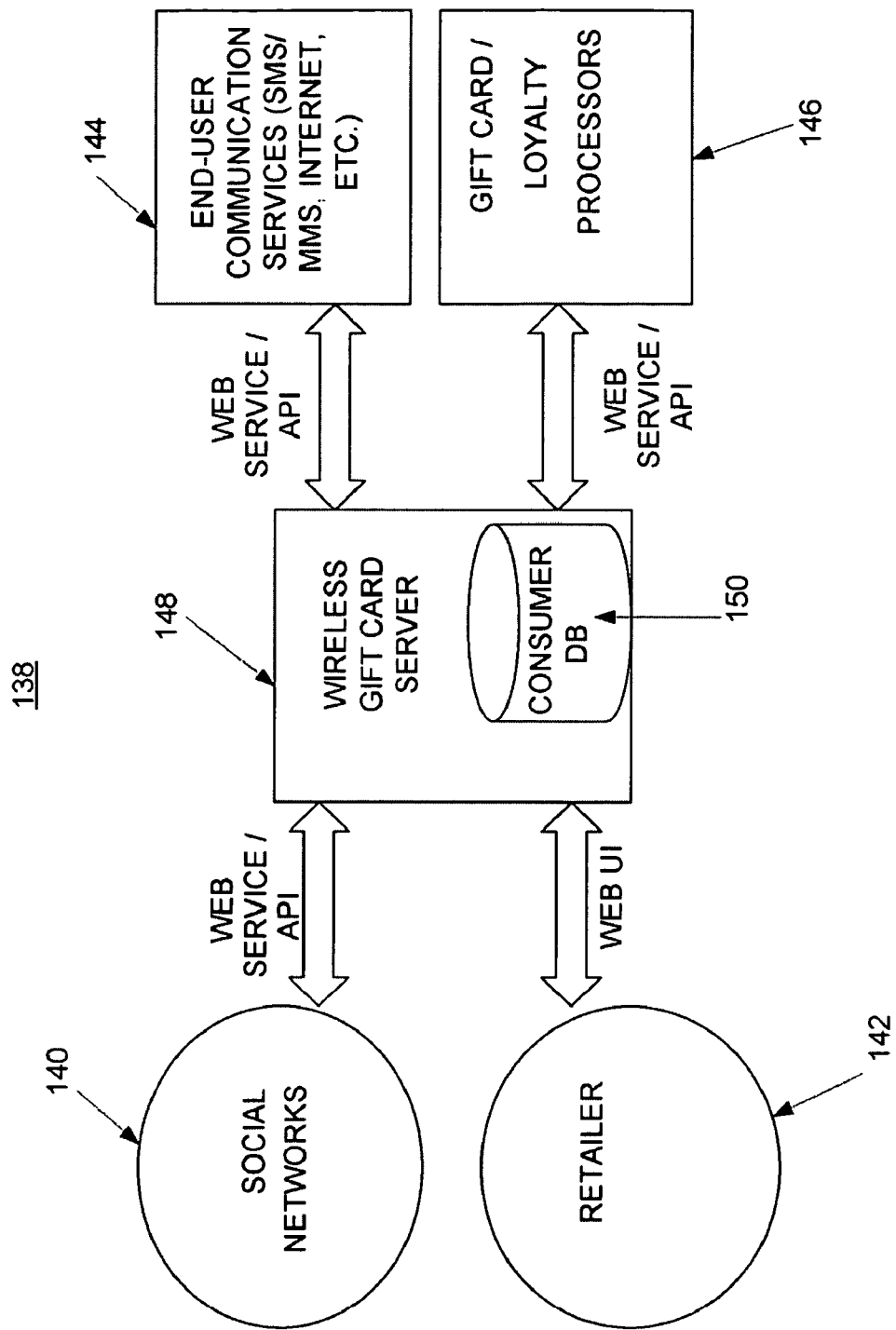
FIG. 1B is a block diagram of a system to integrate social networking services and gift card services.

FIG. 1B is a block diagram of a system 138 to integrate social networking services and gift card services. The system 138 of FIG. 1B has components that may be similar to components of the system 100 of FIG. 1A with some exceptions including that the system 138 is integrated with social networks 140 and loyalty processors 146. Similar components may operate similarly. For example, the retailer 142 of FIG. 1B may operate similarly to how a combination of the merchant gift card point of sales system 104 and merchant web site 102 operate. As another example, the end-user communication services 144 may operate similarly to how the combination of the SMS/MMS network 118, the phone data 134, and the internet access 126 operate. As another example, the wireless gift card server 148 and consumer database 150 may operate similarly to how the wireless gift card server 106 and account information 132 operate.

In general, integration of the social networks 140 and loyalty processors 146 with the wireless gift card server 148 may be supported by features provided by components of the system 138 that may be facilitated by web service calls or other API calls. The features may be implemented by services offered by the wireless gift card server 148. The features may include provision of merchant credit services for presentation in the social networks 140, tracking of information related to their provision in the social networks 140 (e.g., a number of users that browse a profile that presents the merchant credit service or an amount of interest in a merchant credit service which may be indicated by a number of clicks on a merchant credit service provided through a user interface), sale of merchant credit services through the social networks 140, sending of targeted communication to members of social networking services based on their merchant credit services, and the like.

A feature related to providing merchant credit services for presentation in social networks 140 may be implemented by presenting gift cards in profiles of members of a social network. For example, a member of a social network may be able to edit a profile to indicate wireless gift cards they are interested in receiving, wireless gift cards they currently have, and the like. Following that example, a list of wireless gift cards associated with a user may be stored in response to edits by a user. Then, when other members or non-members request the profile of the member, information about the wireless gift cards associated with the member may be retrieved from storage and presented alongside a profile of the member. For example, a profile of a member may include a list of wireless gift cards desired by a member alongside a picture of a member, their name, and contact information. To provide the feature, web services offered by the wireless gift card server 148 may include one or more of the following. One web service may provide a list of available wireless gift cards that may be added to profile. Another web service may provide a list of wireless gift cards associated with a mobile phone number of a member of a social network. Information associating a member of a social network with merchant credit services may be stored at the social networks 140 or at the wireless gift card server 148.

Tracking of information related to the provision of merchant credit services in the social networks 140 may include tracking a number of users that browse a profile including a mention of the credit service and a number of clicks of interest on a merchant credit service associated with a member, and maintaining a loyalty indicator associated with the member. To provide the tracking, a number of users that browse a profile or a number of clicks of a merchant credit service from a member's profile (e.g., similar to web-based advertising) may be stored (e.g., by the social networks 140 or the wireless gift card server 148) and the social networks 140 may communicate tracking information with the wireless gift card server 148. To provide for the maintenance of a loyalty indicator, the wireless gift card server 148 may communicate with the loyalty processors 146 to indicate whether a loyalty indicator is to be modified. For example, if the wireless gift card server 148 tracks 250 clicks to a wireless gift card of a certain retail chain of a member over the course of a week, the server 148 may send a message at the end of the week to a loyalty processor that maintains a loyalty indicator for retail chain that the member has received 250 clicks, which may cause the loyalty processor to increase a loyalty indicator (e.g., a number of points may be increased in some proportion to a number of clicks). In addition to clicks that register interest in a merchant credit service, other types of information may be tracked and may result in changes to a loyalty indicator associated with a member of a social network. For example, a sale of a wireless gift card based on a series of interactions that started with a click of a link at a member's profile and led to a series of dialogue boxes to purchase the wireless gift card may be tracked.

A member of one or more social networks may be associated with one or more loyalty accounts, programs, or both. For example a person may be a member of three different social networks, at each of which there may be an account associated with a same set of five different wireless gift card providers, where each of the wireless gift card providers has a loyalty account that is maintained by different loyalty processors and the person has an account with each of the loyalty processors. The person may associate each of the five loyalty processor accounts with each of their three social network profiles such that a total of fifteen associations between social network accounts and loyalty processor accounts exist. Those associations may be maintained by the social networks 140, by the wireless gift card server 148, or both. For example, the person may have all three profiles associated with a loyalty account associated with the GAP retail brand and the wireless gift card server 148 may manage associations between social network accounts and the loyalty account (e.g., storing associations and mapping statistics associated with a social networking account to a loyalty provider account) such that clicks from any of the three profiles are associated with a same loyalty account and sent to the loyalty processor that manages the account such that the loyalty processor may increase a loyalty indicator based on the click traffic information relayed by the wireless gift card server 148.

Sale of merchant credit services may be supported through the social networks 140. In particular, wireless gift cards maintained by the wireless gift card server 148 may be offered for sale and purchased through an integration of the social networks 140 and the wireless gift card server 148. For example, a list of merchant credit services associated with a member of a social network may be presented through the social network. Then, a user may click on one of the merchant credit services and the wireless gift card server 148 may interact with the social networks 140 to complete a sale of a wireless gift card. For example, a user may personalize a wireless gift card through web content sent by the wireless gift card server 148 and presented in a frame of a social network web site such that a look and feel of the social network web site is preserved. Then, the user may enter payment information, enter a mobile phone number of an intended recipient, and the intended recipient may be contacted. Contacting the intended recipient may include any of the types of communication described above, such as SMS, MMS, electronic mail, or a combination of them, and the contact may be part of a process to activate a wireless gift card or may include information identifying an activated wireless gift card (i.e., there may be an activation process that does not require user involvement).

Sending of targeted communication to members of social networking services based on their merchant credit services, may involve receiving selection criteria for a targeted communication, such as an advertisement; mining data corresponding to members of social networks and wireless gift cards, such as types of retailers, a location of a user, and the like, where the information may be stored at a wireless gift card server; matching the criteria to the mined data to select members to which to send the targeted communication; and sending the targeted communication to the selected members, such as a message through a messaging systems of a social network, an SMS or MMS, or an electronic mail.

The loyalty processors may provide accounts from which loyalty related to gift card services may be accrued and may be a same or different entity from a gift card service provider. For example, a retailer may outsource loyalty processing to a third party loyalty processor that manages loyalty programs of the retailer. An entity responsible for a loyalty program may differ from an entity responsible for a gift card service but there may be an association between the two such that loyalty may be accrued based on activity related to gift card services. For example, a retailer of clothing may provide gift cards and may be associated with an airline company that has a loyalty account and loyalty credit, such as miles for a frequent flier account, may be accrued based on click traffic associated with gift cards provided by the retailer.

Although the description with regards to FIG. 1B includes a certain number, and type of features and services offered through the integration of the wireless gift card server 148 with the social networks 140 and loyalty processors 146, implementations may vary. For example, a wireless gift card message that is sent to a mobile device as an SMS or MMS may trigger downloading of an application from the wireless gift card server 148 to the mobile device, where the application may allow for better management and purchasing of wireless gift cards via a mobile device (e.g., as described above with reference to FIG. 1A). Similarly, the system 138 may include fewer, additional, or different components.

FIG. 2A is a diagram illustrating a user interface from which to request a wireless gift card. The user interface may be a user interface of the merchant web site 102 of FIG. 1A. The user interface includes a web page that is branded in accordance with a branding scheme of a coffee shop, and includes user interface components for personalizing a wireless gift card.

For example, the user interface includes a logo 202 of a coffee shop and a user interface area including a variety of user interface components 204. The user interface components 204 allow for personalizing of a wireless gift card with an audio recording and text message; indicating a name of a gifter; indicating an amount of merchant credit to be associated with a wireless gift card; and a name, electronic mail address, and mobile phone number of an intended recipient.

In particular, the buttons 206 allow for recording and previewing of an audio recording, a text field 208 allows for entering a name of a gifter (which may also be a purchaser), a pull-down menu 210 allows for entering of a wireless gift card amount, a combination of first and last name text fields 212 allow for entering of a recipients name (which may be used for authentication of a wireless gift card), a text field 214 allows for entering a recipients electronic mailing address, a combination of text fields 216 allow for entering a recipients mobile phone number, and a text field 218 allows for entering a text message.

Although not shown, another web page may be used to settle purchasing of a wireless gift card by entering, for example, credit card information.

Although the user interface of FIG. 2A includes a certain number and type of components and features, user interfaces may include additional, fewer, or different components, features, or both. For example, a user may be allowed to upload a picture or video file. As another example, a theme of a wireless gift card may be selected from multiple themes.

Figure 2B:
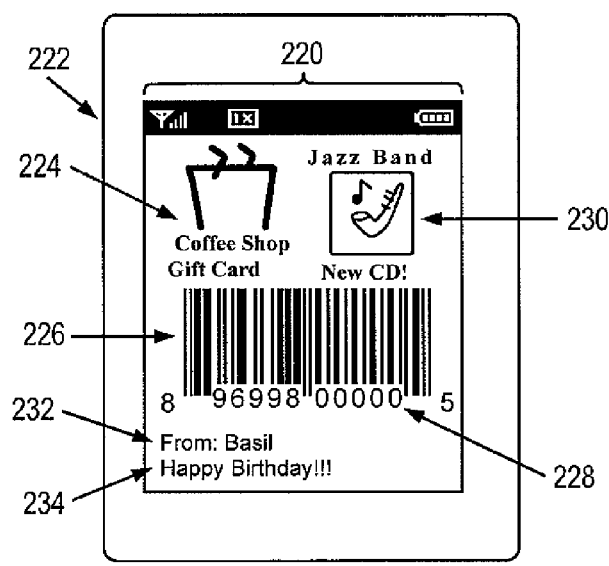
FIG. 2B is a diagram illustrating a wireless gift card on a mobile device.

FIG. 2B is a diagram illustrating a wireless gift card 220 on a mobile device. A border 222 illustrates what may be a border of the mobile device (e.g., an area surrounding a liquid-crystal display). The wireless gift card 220 includes a logo 224 of a coffee shop being a merchant from whom the wireless gift card may be merchant credit, a bar code 226 of a wireless gift card account number, a wireless gift card account number 228, an advertising space 230 dedicated to a jazz band, a name of a sender 232, and a text message 234.

The wireless gift card of FIG. 2B may be a result of the entry of information in the user interface of FIG. 2A. For example, the name of the sender 232 may be from the text field 208 of a name of a gifter, and the text message 234 may be from the text field 218 for a text message. The wireless gift card may be sent to an intended recipient specified in the text fields 216. Some of the wireless gift card information from the user interface of FIG. 2A may be retained as account information used for authentication. For example, the first and last name entered in the first and last name text fields 212 may be used for authentication.

Although the wireless gift card 220 includes a certain number and type of components and features, user interfaces may include additional, fewer, or different components, features, or both. As examples, video may be displayed, the advertising space 230 need not exist, a text message including only a text version of the gift card number 228 and the text message 234 may be sent to a user of an SMS-enabled phone, and the like.

Figure 2C:
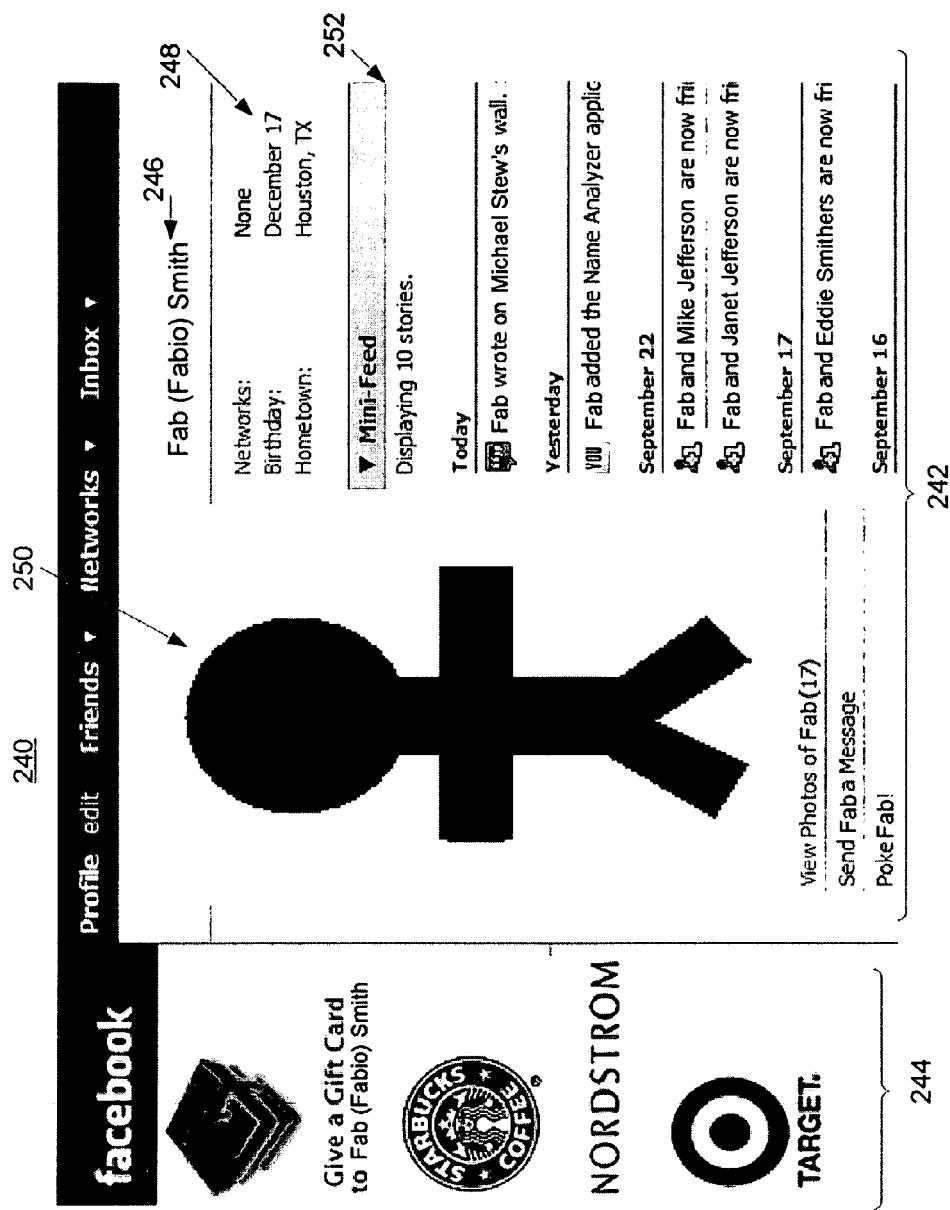
FIG. 2C is a diagram illustrating a user interface of a social networking service to present gift card services.

FIG. 2C is a diagram illustrating a user interface 240 of a social networking service to present gift card services. In general, the user interface 240 includes a web page that may be presented by a wireless gift card server (such as the wireless gift card server 148), a social networking web site, or a combination of the two. The user interface 240 includes a combination of content related to a profile of a social network 242 and a list of wireless gift card services 244, both of which are presented together with a similar look and feel.

The list of wireless gift card services 244 includes a list of three gift card service providers, including STARBUCKS COFFEE, NORDSTROM, and TARGET. The list of wireless gift card services 244 are a list of wireless gift card services that are associated with the member of the profile that is shown. Wireless gift card services associated with other members of a same social networking service may vary. The wireless gift card services that are associated with a member may be associated with a user by their own selection, as depicted in the user interface of FIG. 2D. In implementations, the mechanisms for selecting gift card services to associate with a user may vary. For example, based on a selection of interests of a member (e.g., hiking, camping, sailing, and the like), a selection of gift card services may be dynamically generated each time a profile is to be presented to a user. As another example, some gift card providers may be shown based on advertisement "space" purchased by a user and their existence in the list may be denoted as a "sponsored" gift card service.

The content related to a profile of a social network 242 includes a variety of information about a member, including a name of a member 246, their birth date 248, a photo of them 250, a feed 252 of actions related to the member, and the like. In implementations additional, different, or less information may be included in a profile and presented to a user.

The list of wireless gift card services 244 having a same look and feel as an interface as a social networking service may include having similar layout styles, a similar font style, a similar use of color, a use of similar pictures, a user of a same parent interface, and the like.

Wireless gift card services in the list of wireless gift card services 244 may be interacted with by a user through the user interface 240. For example, a user may click on one of the logos of a wireless gift card services and further information about the selected wireless gift card service, including an opportunity to purchase a wireless gift card from the selected service may be presented to a user. The further information may be presented in a same or different user interface.

Figure 2D:
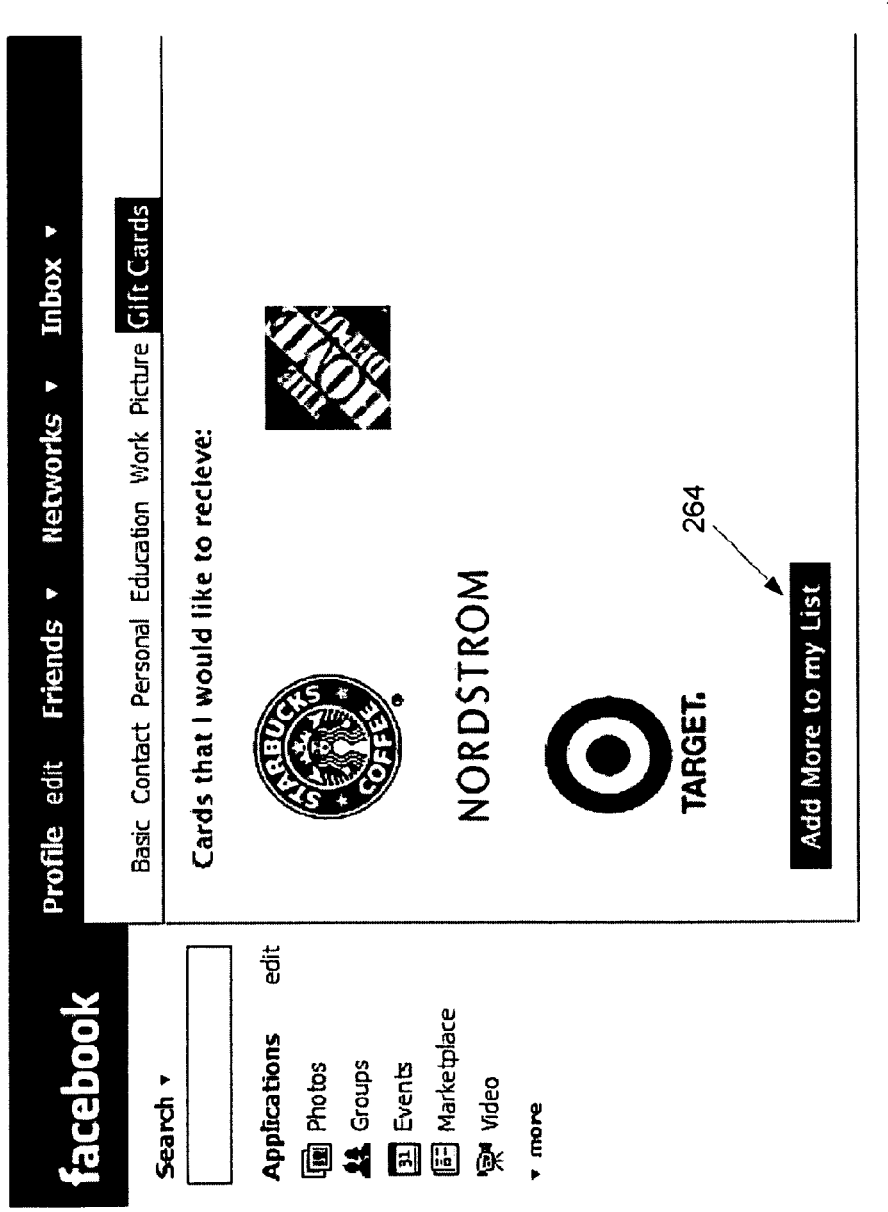
FIG. 2D is a diagram illustrating a user interface for a social networking service where indications of gift card services may be modified.

FIG. 2D is a diagram illustrating a user interface 260 for a social networking service where indications 262 of gift card services may be modified. The indications 262 of gift card services may be indications of gift card services to associate with a member of the social networking service such that the gift card services are presented to users of the social networking service when viewing a profile of the member. For example, the indications 262 of gift card services may be indications of those gift card services to include in the list 244 of FIG. 2C. As shown in the user interface 260, a user may modify the indications 262 by adding wireless gift card services using the "Add More to my List" button 264.

Implementations may include different user interfaces with different functionality for adding, removing, or altering indications of wireless gift card services and further information may be selected. For example, a member may provide preferences for wireless gift card services in a user interface that may translate into wireless gift card services that are presented. For example, a member of a social networking service may select a set of preferences for their profile to indicate they want to receive a wireless gift card for any coffee house near the 92121 zip code (e.g., a type of service or good in combination with location criteria), in response to which a wireless gift card server or other components of a system including a wireless gift card server may search for wireless gift card services to display. Following that example, should a user purchase a wireless gift card for the member, that information may be used to provide further information to the member when they receive a message indicating they received a wireless gift card. For example, the member may receive directions to coffee houses near them for which a wireless gift card may be used. In implementations, other preferences related to a wireless gift card may be associated with a member of a social networking service. For example, a member of a social networking service may indicate they wish to receive a STARBUCK's wireless gift card in amounts that equal multiples of Grande Lattes and when purchasing a wireless gift card suggested amounts for a wireless gift card may be provided to a potential purchaser. As another example, a member may indicate the type of information they wish to receive with a wireless gift card (e.g., directions to a nearest brick and mortar retail location or simply the address of the location which may be cut and pasted to mobile device navigation software to map a more precise route).

Although FIGS. 2C-2D include the use of a web site for a social networking interface integrated with gift card services, implementations may vary.

Figure 3A:
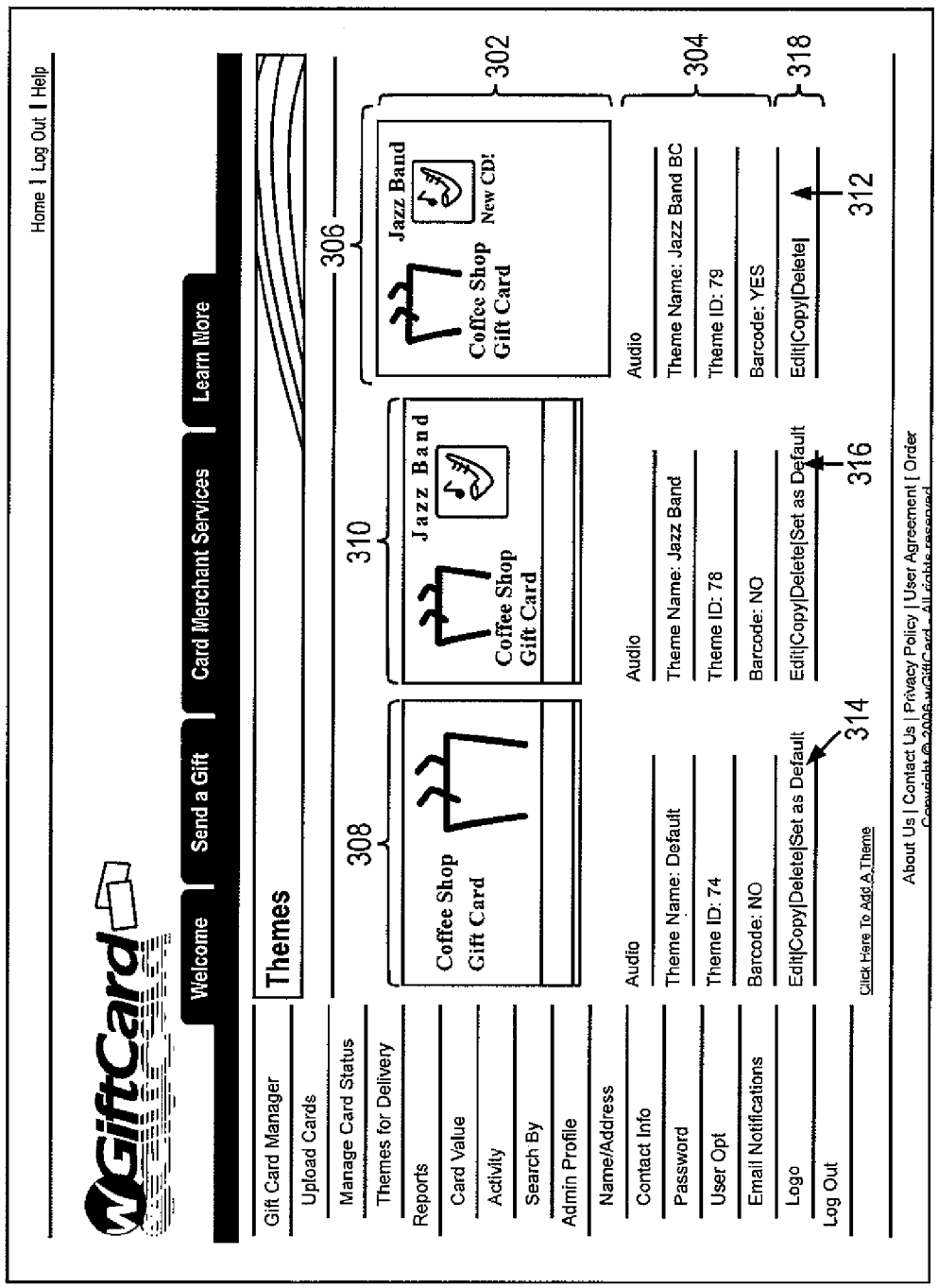
Figure 3B:
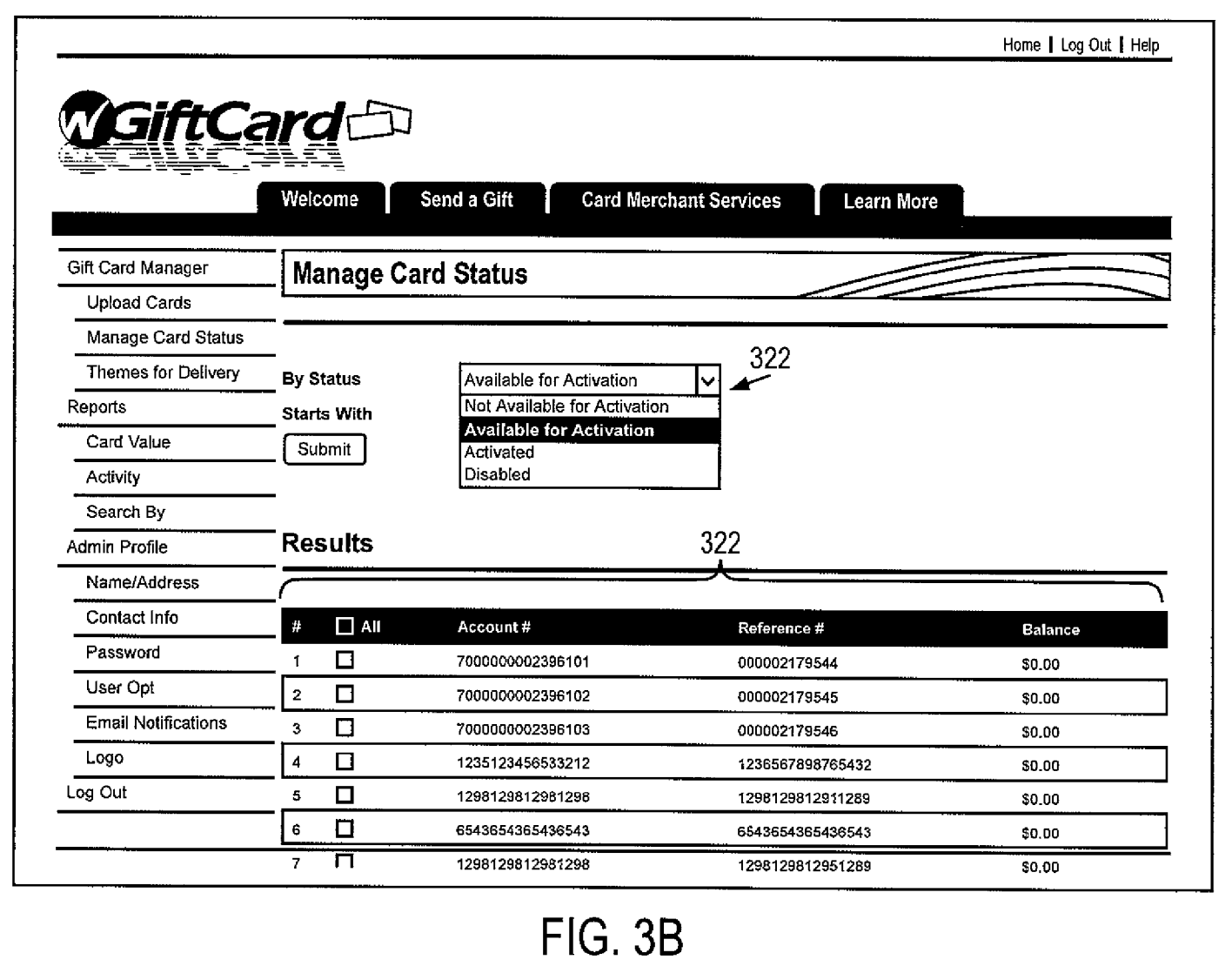

FIGS. 3A-3B are diagrams illustrating user interfaces for managing wireless gift cards. In general, the user interfaces may be used by a merchant to manage wireless gift cards. In a first user interface of FIG. 3A, themes of wireless gift cards may be managed. For example, three themes 302 of wireless gift cards are illustrated, each of which includes different features, as indicated in the lists of features 304. For example, a third theme 306 allows for bar codes while first and second themes 308, 310 do not.

The different themes may be edited by the merchant, copied, deleted, or set as a default, as indicated by the options 318.

Any of themes may be selected by a merchant as a default for sending to intended recipients of wireless gift cards. For example, the third theme 306 is currently set as a default as indicated by a lack of having a set as default option in the space 312 in comparison to the set as default options 314, 316 of the first and second themes 308, 310.

In general, themes may be allocated for a wireless gift card using various techniques. For example, some themes may depend on capabilities of a mobile device and may be allocated accordingly. For example, one theme may be allocated to mobile devices having MMS messaging while another theme may be selected for mobile devices only supporting SMS messaging. As another example, a selection of themes may be provided to a wireless gift card purchaser and the purchaser may select from the themes (e.g., there may be themes for different occasions, such as birthdays, Father's day, Mother's day, Halloween, and the like).

FIG. 3B is a diagram including a user interface to view status of wireless gift cards. The user interface includes a pull-down menu 320 for filtering a list 322 of wireless gift cards. The list 322 of wireless gift cards includes details about wireless gift cards, including an account number, reference number, and balance. Although not shown, various features may be associated with the list. For example, a merchant may use the list to find a wireless gift card associated with a mobile phone number of a device that was lost or stolen to cancel a wireless gift card and re-issue it such that it appears on a new mobile device associated with the mobile phone number.

Although FIGS. 3A-3B include diagrams of user interfaces having a particular combination of features for merchants, implementations may vary. For example, the list 322 of wireless gift cards in the user interface of FIG. 2B may include a text field for entering a mobile phone number that may be used to filter the list to include only wireless gift cards associated with the mobile phone number.

Figure 4:
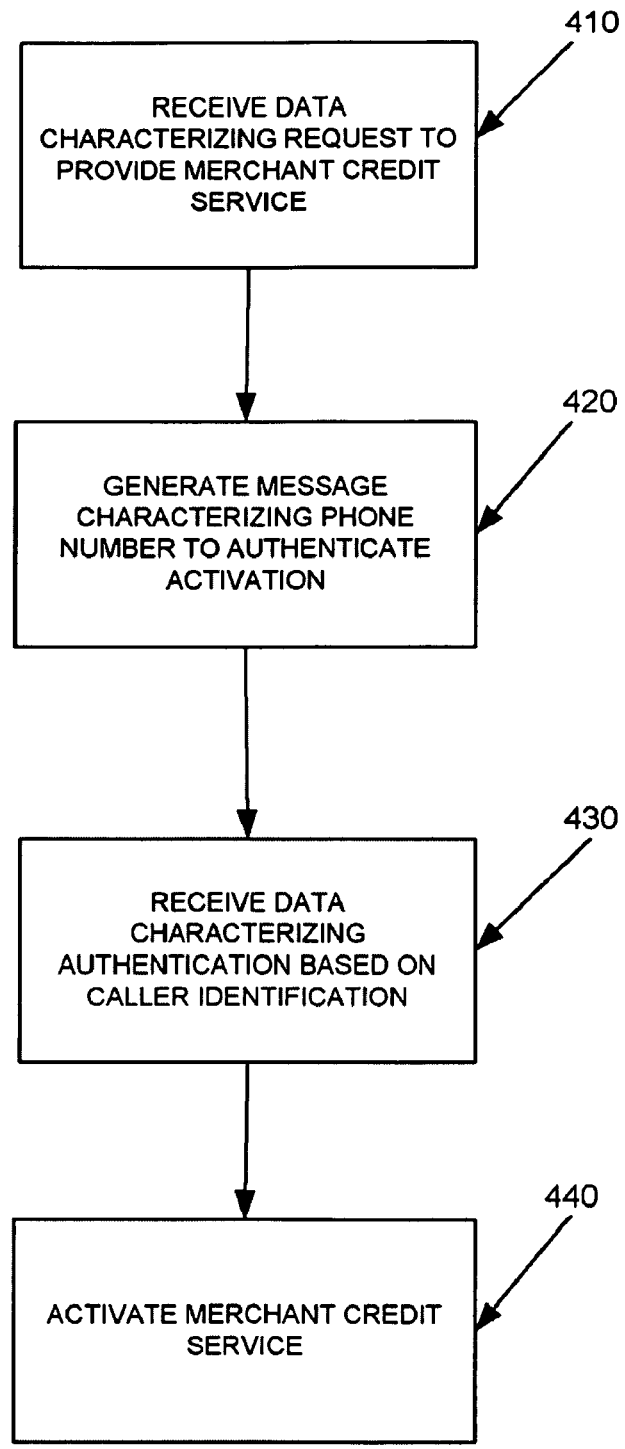
FIG. 4 is a flowchart illustrating a process to activate a merchant credit service.
Figure 5:
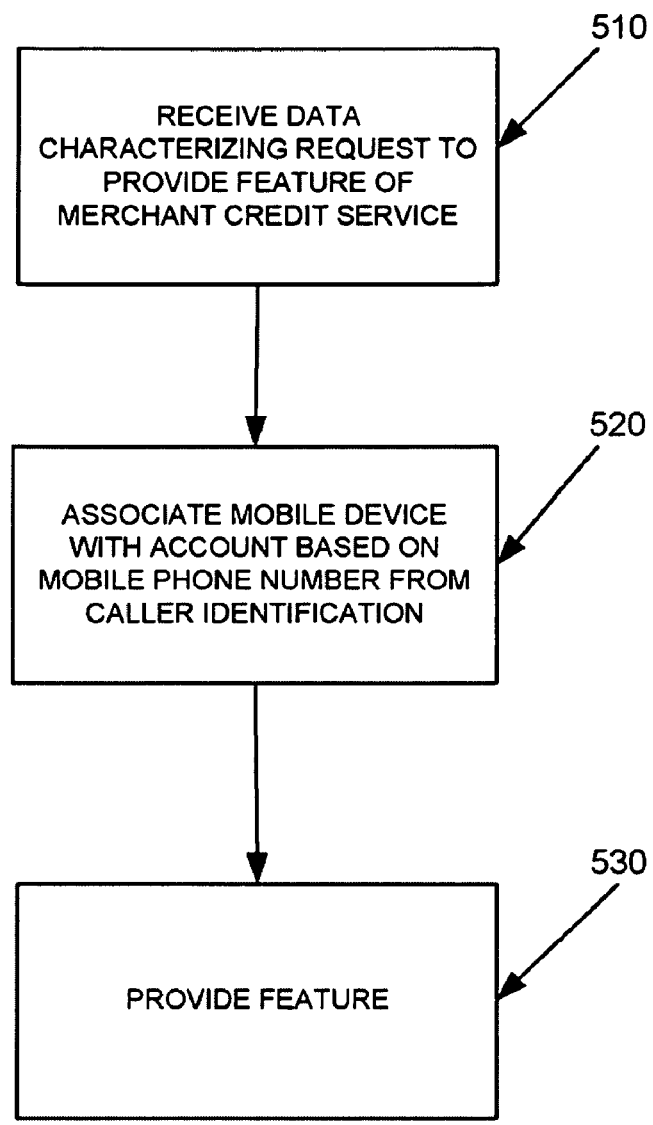
FIG. 5 is a flowchart illustrating a process to provide a feature of a merchant credit service.
Figure 6:
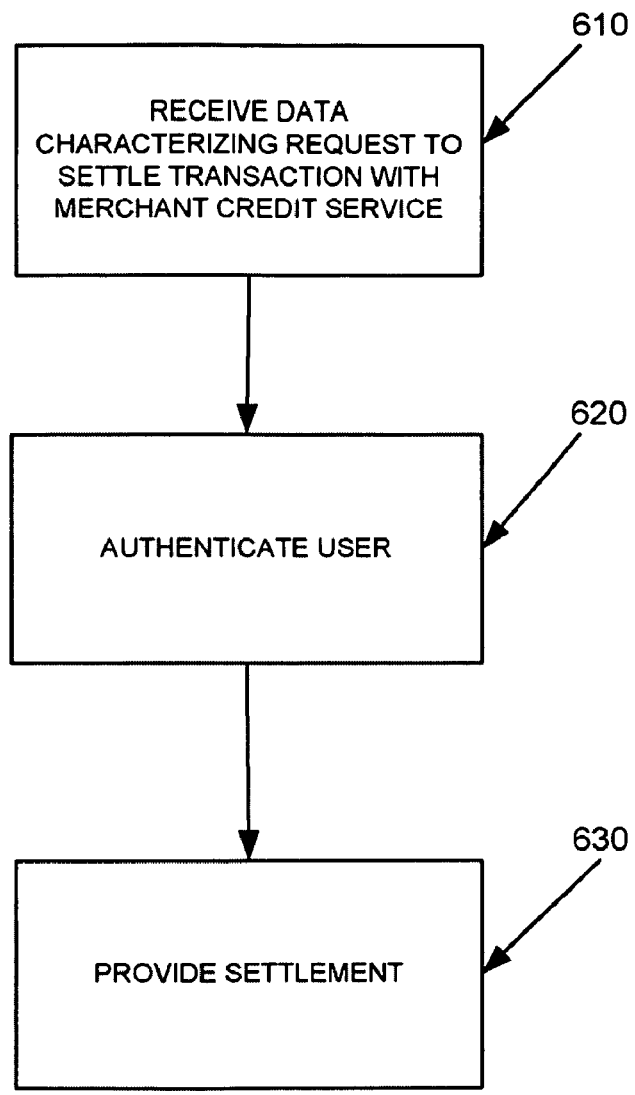
FIG. 6 is a flowchart illustrating a process to settle a transaction with a merchant credit service.

FIG. 4 is a flowchart illustrating a process 400 to activate a merchant credit service, FIG. 5 is a flowchart illustrating a process 500 to provide a feature of a merchant credit service, and FIG. 6 is a flowchart illustrating a process 600 to settle a transaction with a merchant credit service. For FIGS. 4-6, a merchant credit service may be a wireless gift card service, as described above, and the operations of the processes 400, 500, 600 may be performed in a system such as the system 100 of FIG. 1A. For example, the operations of each of the processes 400, 500, 600 may be performed by the wireless gift card server 106, the merchant gift card account server 128, or a combination of the two.

In general, the process 400 of FIG. 4 includes receiving data characterizing a request to provide a merchant credit service (410), generating a message characterizing a phone number to authenticate activation (420), receiving data characterizing authentication based on caller identification (430), and activating a merchant credit service (440).

Data received that characterizes a request to provide merchant credit service (410) may include, as examples, receiving a purchase request of a wireless gift card from a web site offering wireless gift cards for sale (e.g., a merchant web site for which credit of the merchant may be applied to purchases of goods or services or a third-party web site dedicated to offering wireless gift cards for sale). The request may include an amount (e.g., an amount of money in United States dollars) and a mobile phone number of an intended recipient. The intended recipient may be the same as a purchaser or a different entity. The data may further include personalization information that may be included in a wireless gift card.

Although not included in the process 400, a request to provide merchant credit service may cause an account to be generated (e.g., at a wireless gift card server, a gift card server for physical gift cards, or a server that combines functionality of both) and return account information to a server that generates gift cards for mobile devices. The account information may be associated with a mobile phone number by the server that generates gift cards for mobile devices, and that server may generate an SMS or MMS message that includes the account information. For example, a message may be generated by interfacing with an API of a mobile carrier (e.g., VERIZON or T-MOBILE may offer APIs that may be used to generate text messages by interfacing with SMS servers). Gateway companies (e.g., GOLDPOCKET or CLICKATELL) may be used to interface with carriers to transmit SMS messages. In both cases there any of several techniques may be used to interface with SMS servers. SMPP (Short Message Peer to Peer protocol) may be used to interface with SMS servers.

As another example, a gifter may visit a merchant web site to purchase a wireless gift card to send to a recipient. The gifter may fill out a dollar amount, recipient phone number and proceed through standard merchant shopping cart user interfaces to complete a purchase. The Merchant web site gets authorization of funds from merchant account and sends information (dollar amount, phone number, theme & personal message) to a wireless gift card server. A wireless gift card server may forward information to a merchant gift card account server and receive a new account number that is funded with the amount, and the account number may be used to generate a wireless gift card. A wireless gift card server may automatically generate an account with a phone number as username and account number as password, which a recipient may use to access their account through a web browser. A phone number may be linked to many account numbers.

To associate personalization information, one or more interfaces may be provided for receiving and associating personalization information to a wireless gift card at the wireless gift card server. For example, a web interface used for purchase of the wireless gift card may allow for uploading of images, video clips, or audio clips to be associated with a wireless gift card and a text field may be provided for personalizing a message to be included with a wireless gift card message. The personalization information may be stored at the wireless gift card server or another server. As another example, a phone number may be provided that allows for a wireless gift card sender to generate a voice message that is associated with a wireless gift card. The voice message may be included as part of a wireless gift card (e.g., as part of an MMS or an electronic mail attachment) or may be retrievable by another mechanism. For example, a voice message may be retrievable by dialing a phone number associated with a server that stores voice messages for wireless gift cards and a number, such as wireless gift card number, may be used to retrieve the voice message. Other multimedia may be included with a wireless gift card, such as promotions or advertisements of a retailer associated with a wireless gift card.

A message characterizing a phone number to authenticate activation is generated (420). The message may be a wireless gift card or a wireless gift card may be sent separately (e.g., after authentication). The message may be a message to cause a server to generate a message (e.g., an API call to an SMS server to generate an SMS message). In general, a wireless gift card includes sufficient information from which a transaction may be settled (in whole or in part) with a wireless gift card service. For example, a wireless gift card may simply include an account number which may be used by a cashier at a merchant point of sales system that is linked to an account balance that is used by the merchant point of sales system to determine how much of a transaction may be settled with the wireless gift card. A wireless gift card may further include personalization information, and advertisements or promotions. The form of an account number may include a text number, a bar code, or both.

A wireless gift card may include authentication information, such as a PIN, that is associated with the wireless gift card and required to redeem the wireless gift card. Authentication information may otherwise be sent to a user (e.g., through a separate message or available by dialing a phone number).

Data characterizing authentication based on caller identification (430) is received. For example, a user may receive a message that includes a phone number for activation in response to which the user may call the number and an IVR system may use the caller identification information provided by a telephone company to identify the phone number from which the user is calling. The user may be authenticated based on a match of the number from which the user is dialing and the number to which the message including the phone number was sent. Other information may be used in addition to caller identification to authenticate a caller.

A merchant credit service is activated (440). Activating a wireless gift card may include changing an activation flag in a database of account information for wireless gift cards.

In general, the process 500 of FIG. 5 includes receiving data characterizing a request to provide a feature of a merchant credit service (510), associated a mobile device with an account based on a mobile phone number from caller identification (520), and providing a feature (530).

Data characterizing a request to provide a feature of a merchant credit service is received (510). The data may be a text message from a mobile device requesting a feature or a phone call to an IVR system. The feature may be, as examples, a request for a balance of a wireless gift card, a request to transfer a wireless gift card to another mobile phone number with which to associate a wireless gift card, and the like. A message from a mobile device may be a reply to a message or a message to a short code. For example, a user of a mobile device may send a message to short code for wireless gift cards that includes a keyword phrase "BAL," which may be a request for remaining balance associated with a wireless gift card. The message may include information identifying a wireless gift card. For example, in a situation where multiple wireless gift cards are associated with a same wireless gift card, the message may include a last four digits of a wireless gift card account to identify one wireless gift card from multiple wireless gift cards.

A mobile device is associated with an account based on a mobile phone number from caller identification (520). In general, the caller identification may be used to authenticate a user and identify an account for merchant credit services. The caller identification may be obtained from a message (e.g., from a text message from a mobile phone number) or from a call to a system (e.g., a call to an IVR system). For example, a user of a mobile device may be prompted to call an IVR system as part of transferring a wireless gift card in which case automatic number identification to the system may be used to determine the phone number of the mobile device. The association may be performed at a server that stores accounts for wireless gift cards, such as the wireless gift card server 106 of FIG. 1A, or another server.

A feature is provided (530). For example, in response to a request for balance and identifying an account of a wireless gift card associated with a mobile phone number, a message including a remaining balance of the wireless gift card may be sent to the mobile phone number.

In general, the process 600 of FIG. 6 includes receiving data characterizing a request to settle a transaction with a merchant credit service (610), authenticating a user (620), and providing settlement (630).

Data characterizing a request to settle a transaction with a merchant credit service is received (610). A request to settle a transaction may be from a merchant point of sales system or at a web site. The data may be a message, such as a message from one computer system to another, such as an application to application message. For example, a wireless gift card server may receive a message from a merchant web site requesting to settle a transaction relating to a purchase of goods or services from the merchant web site. The data characterizing the request may include an account number of the merchant credit service. For example, the data may include a wireless gift card account number that was scanned by a bar code reader of a merchant point of sales system. The request may further include other information, such as a requested amount for which to settle a transaction.

A user is authenticated (620). A user may be authenticated by one or more techniques. For example, authenticating a user may include a combination of one or more of matching caller identification with a mobile phone number associated with an account, matching a PIN associated with an account, matching photo identification with a user name associated with an account, matching a sender of a wireless gift card with a proper sender, and the like. For example, a user may be prompted at a merchant point of sales system to enter a PIN into a keypad and the PIN may be matched to a PIN associated with a wireless gift card. As another example, a user may call a phone number that prompts a user for the PIN, and a caller identification of the call in combination with the PIN may be used to authenticate the user. As another example, a user may enter a mobile phone number and PIN at a web site when checking out to complete a purchase.

Settlement is provided (630). Providing settlement may include authorizing a transaction, indicating an amount for which transactions are authorized, settling an account during an authorization window of a set amount of time during which a user may perform a transaction, and the like.

Figure 7A:
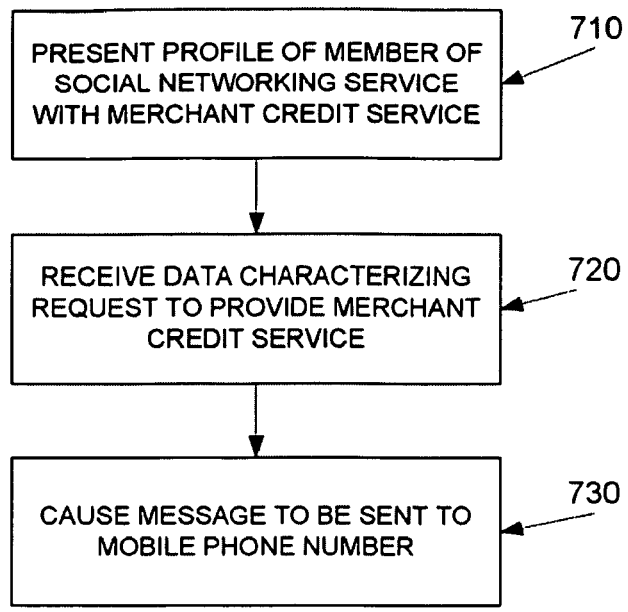
FIG. 7A is a flowchart illustrating a process to respond to requests for merchant credit services through a social networking service.

FIG. 7A is a flowchart illustrating a process 702 to respond to requests for merchant credit services through a social networking service. In general, the process 702 includes presenting a profile of a member of a social networking service with a merchant credit service (710), receiving data characterizing a request to provide merchant credit service (720), and causing a message to be sent to a mobile phone number (730). The process 702 may be implemented by a system that includes a wireless gift card server or functionality of a wireless gift card server integrated with social networking services, such as the system 138 of FIG. 1B. For example, the process 702 may be performed by a server of a social networking service, a wireless gift card server, or a combination of the two.

Presenting a profile of a member of a social networking service with a merchant credit service (710) may include presenting information of a profile from a member together with a list of merchant credit services, which may be wireless gift cards. For example, the user interface 240 of FIG. 2C may be presented to a user. Presenting may include sending or causing to send web content, such as a web page. The merchant credit service may be presented along with other merchant credit services, such as in a list of merchant credit services. Presenting the merchant credit service may include presenting a logo associated with the merchant credit service, a text description of the merchant credit service, and the like.

Receiving data characterizing a request to provide merchant credit service (720) may include receiving data characterizing a user click on information associated with a merchant credit service. For example, a social networking service may receive an HTTP request from a user that indicates a user wishes to start a process to purchase a wireless gift card, where the link of the HTTP request is encoded in a web page presenting a list of merchant credit services.

Causing a message to be sent to a mobile phone number (730) may include generating a message including information about a merchant credit service, such as an account number of a wireless gift card or a link to a web site to start a process to activate a wireless gift card. The message may be sent using SMS, MMS, or another protocol. In addition to sending a message to a mobile phone number, the message may be sent using other protocols to other types of addresses. For example, a message may be sent to an electronic mailing address or a social networking message system address. The mobile phone number is a mobile phone number of an intended recipient who may be the same as or different from the member for which profile information was presented at 710. The mobile phone number and other information to be used by the merchant credit service may be provided by the social networking service from an account of the member whose profile was presented at 710.

The merchant credit service may be any of the merchant credit services as described above and may include any of the features described above. For example, the merchant credit service may be for a wireless gift card that requires PIN numbers for security and allows a user to manage wireless gift cards through a web site.

Figure 7B:
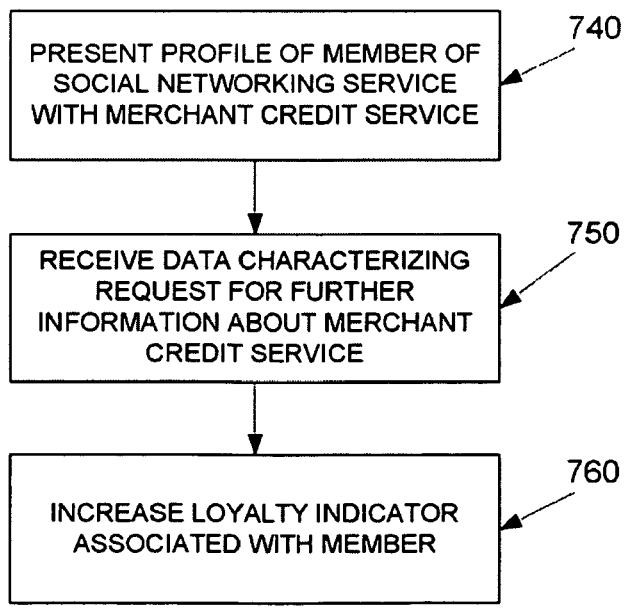
FIG. 7B is a flowchart illustrating a process to increase a loyalty indicator in response to receiving requests for information about merchant credit services through a social networking service.

FIG. 7B is a flowchart illustrating a process 704 to increase a loyalty indicator in response to receiving requests for information about merchant credit services through a social networking service. In general, the process 704 includes presenting a profile of a member of a social networking service with a merchant credit service (740), receiving data characterizing a request for further information about the merchant credit service (750), and increasing a loyalty indicator associated with the member (760). The process 704 may be implemented by a system that includes a wireless gift card server or functionality of a wireless gift card server integrated with social networking services, such as the system 138 of FIG. 1B. For example, the process 704 may be performed by a server of a social networking service, a wireless gift card server, some combination of two, or a loyalty processor in combination with the two.

Presenting a profile of a member of a social networking service with a merchant credit service (740) may be the same as the presenting of the profile of a member of a social networking service with a merchant credit service as described with reference to the sub-process 710 of FIG. 7A.

Receiving data characterizing a request for further information about the merchant credit service (750) may include receiving data characterizing a user click on information associated with a merchant credit service. For example, a social networking service may receive an HTTP request from a user that indicates a user wishes to start a process to purchase a wireless gift card or find out more information about a wireless gift card service, where the link of the HTTP request is encoded in a web page presenting a list of merchant credit services.

Increasing a loyalty indicator associated with the member (760) may include increasing an indicator of loyalty that is associated with a member in response to the request of the sub-process at 750, sending a message to a loyalty processor of tracking information associated with a merchant credit service in response to which the loyalty processor may increase a loyalty indicator, and the like. The indicator may be associated with a loyalty account of the member at a wireless gift card server, a loyalty processor, or another party. The loyalty indicator may be increased in proportion to an amount of interest received through a social networking service associated with the member. The loyalty indicator may be used for rewards associated with a merchant credit account associated with the member. For example, for every 100 clicks by distinct IP addresses for further information about a merchant credit service provided by a coffee retailer, the coffee retailer may provide an amount equivalent to a type of drink that can be purchased at the coffee retailer using a wireless gift card account associated with the member. The loyalty indicator may be a number, such as a number of miles or points associated with a loyalty program.

Although the processes 400, 500, 600, 702, 704 of FIGS. 4, 5, 6, 7A, 7B include a certain number and type of sub-processes, implementations may vary. For example, if in the process 400 data was received that did not authenticate a user of a merchant credit service, the merchant credit service might not be activated. As another example, the process 400 may further include setting authentication information for a user and associating the authentication information with the mobile phone number of the intended recipient of a merchant credit service. Authentication information associated with a wireless gift card may be set by a sender or recipient of a wireless gift card. For example, at a time of requesting a wireless gift card, a sender may input a PIN or other authentication information. As another example, a recipient of a wireless gift card may use a web site associated with the wireless gift card server or gift card account server to set or change authentication information associated with a wireless gift card.

As another example, the process 500 may include authentication beyond use of caller identification. For example, when transferring a wireless gift card a user may be prompted to enter a PIN in a message or for an IVR system.

As another example, the process 702 may include further sub-processes related to purchasing a merchant credit service. As another example, the process 702 may further include sub-processes related to tracking traffic related to interest in the merchant credit service presented with a profile and increasing loyalty indicators in response to tracking the traffic. As another example, a process may include the sub-processes 720 and 730 of FIG. 7A, but not the sub-process 710, and that process may be performed by a wireless gift card server. As another example, the process 704 may further include receiving notifications of rewards accrued to a loyalty account associated with the member. As another example, a loyalty indicator may be increased based on a number of users that browse a profile.

As another example, although wireless gift cards are generally referred to above as being sent in response to a request to provide the gift card which may be understood as being sent shortly after a gift card has been purchased, sending wireless gift cards in response to a purchase may include timed delivery of wireless gift cards (e.g., on a birth date of an intended recipient).

The subject matter described herein can be implemented in digital electronic circuitry, or in computer software, firmware, or hardware, including the structural means disclosed in this specification and structural equivalents thereof or in combinations of them. The subject matter described herein can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

The subject matter described herein has been described in terms of particular embodiments, but other embodiments can be implemented and are within the scope of the following claims. For example, operations can differ and still achieve desirable results. In certain implementations, multitasking and parallel processing may be preferable. Other embodiments are within the scope of the following claims

What is claimed is:

1. A computer-implemented method comprising:
presenting, by a social networking service to a purchaser, at least one website page including a profile of a selected member of the social networking service, the profile including one or more merchant credit services for prepaid merchant account credit, the social networking service providing at least one website in which a plurality of users interact with profiles of members of the social networking service via a graphical user interface, at least some of the users being members of the social networking service, the profiles being generated by each of the respective members, the at least one website page including a graphical user interface element associated with each of the one or more merchant credit services, the purchaser being different than the selected member, the at least one website page providing at least one graphical user interface element allowing the purchaser to add or modify content displayed on the at least one website page;
receiving, by the social networking service from the purchaser via the graphical user interface, a selection of one of the graphical user interface elements associated with a corresponding merchant credit service;
associating, by the social networking service, the selected member having the presented profile with a member phone number using the profile of the member; and
causing, by the social networking service, a message to be sent to the mobile phone number, the message characterizing provision of the first credit service to the selected member.

2. The method of claim 1 further comprising increasing a loyalty indicator associated with the selected member in response to the receiving the request to provide the first credit service, the loyalty indicator being associated with an account of the selected member with the first credit service for loyalty-based services, the loyalty indicator being displayed on the at least one website page including the profile of the member.

3. The method of claim 1 further comprising increasing a loyalty indicator associated with the selected member in response to receiving data characterizing further interest in the first credit service, the loyalty indicator being associated with an account of the selected member with the first credit service for loyalty-based services.

4. The method of claim 1 further comprising adding, on the at least one website page, the first credit service to a list of merchant credit services associated with the profile of the selected member.

5. The method of claim 1 further comprising receiving data generated by the purchaser to personalize the message and wherein the causing the message to be sent comprises personalizing the message in accordance with the data to personalize the message.

6. The method of claim 1, wherein the causing the message to be sent further comprises causing the message to be sent to an electronic mail message address of the selected member.

7. The method of claim 1, wherein the causing the message to be sent further comprises causing the message to be sent to a social network message address of the selected member.

8. The method of claim 1, wherein the message is a Short Message Service message.

9. The method of claim 1, wherein the message comprises a request to activate the first credit service.

10. The method of claim 1, wherein the first credit service is for a gift card in accordance with an amount specified in the request to provide the first credit service.

11. A computer program product, tangibly embodied in a computer-readable storage medium, the computer program product being operable to cause data processing apparatus to perform operations comprising:
presenting, in a graphical user interface to a purchaser, at least one website page including a profile of a selected member of a social networking service with one or more merchant credit services for prepaid merchant account credit, the social networking service providing at least one website in which a plurality of users interact with profiles of members of the social networking service via a graphical user interface, the profiles being generated by each of the respective members and including interests of such members, each merchant credit service having an associated graphical user interface element displayed within the graphical user interface, at least some of the users being members of the social networking service, the purchaser being different than the selected member, the at least one website page providing at least one graphical user interface element allowing the purchaser to add or modify content displayed on the at least one website page;
receiving data generated by the purchaser obtained via the graphical user interface characterizing a request to provide a first credit service from the merchant credit services and a mobile phone number associated with an intended recipient of the first credit service, the intended recipient being different than the selected member, the request being initiated by activation of one of the graphical user interface element in the graphical user interface; and
causing a message to be sent to the mobile phone number, the message characterizing provision of the first credit service to the intended recipient;
wherein the presented one or more merchant credit services for prepaid merchant account credit are selected based on the interests or location of the member and dynamically generated each time the profile is presented to the purchaser.

12. The product of claim 11 further comprising increasing a loyalty indicator associated with the intended recipient in response to receiving data characterizing further interest in the first credit service, the loyalty indicator being associated with an account of the intended recipient with the first credit service for loyalty-based services.

13. The product of claim 11 further comprising adding the first credit service to a list of merchant credit services associated with a profile of the intended recipient.

14. The product of claim 11 further comprising receiving data generated by the purchaser to personalize the message and wherein the causing the message to be sent comprises personalizing the message in accordance with the data to personalize the message.

15. The product of claim 11, wherein the causing the message to be sent further comprises causing the message to be sent to an electronic mail message address of the intended recipient.

16. The product of claim 11, wherein the causing the message to be sent further comprises causing the message to be sent to a social network message address of the intended recipient.

17. The product of claim 11, wherein the message is a Short Message Service message.

18. The product of claim 11, wherein the message comprises a request to activate the first credit service.

19. A method for implementation by one or more data processors comprising:

presenting, by at least one data processor to a first user, a profile of a selected member of a social networking service with a list of a plurality of merchant credit services for prepaid merchant account credit, the credit services to associate credit with a mobile phone number of an intended recipient of the credit services and provide information related to the credit to a mobile device having the mobile phone number through messages to the mobile phone number, the social networking service providing at least one website in which a plurality of users interact with profiles of members of the social networking service via a graphical user interface, at least some of the users being members of the social networking service, the profiles being generated by each of the respective members, the at least one website page providing at least one graphical user interface element allowing a user to add or modify content displayed on the at least one website page;

receiving, by at least one data processor, data generated by the first characterizing a request for further information regarding a first credit service from the list of the merchant credit services, the data characterizing the request received through an interface presenting the profile of the member with the list of one or more merchant credit services; and increasing, by at least one data processor, a loyalty indicator associated with the selected member in response to the receiving the data characterizing further information regarding the first credit service, the loyalty indicator being associated with an account of the selected member with the first credit service for loyalty-based services and being redeemable for rewards associated with the account.

20. The method of claim 19, wherein increasing the loyalty indicator comprises: sending a message to a loyalty processor containing tracking information associated with the merchant credit service in response to which the loyalty processor increases the loyalty indicator.

21. A computer-implemented method comprising:

associating, by a wireless gift card server, a first user with a plurality of social networking services, associating, by the wireless gift card server, the first user with a plurality of wireless gift card providers, the first user having a loyalty account associated with each wireless gift card provider;

rendering, on a client computing system remotely coupled to the wireless gift card server, for each of the plurality of social networking services associated with the first user using the user associations, at least one website page including a profile of the first user at such social networking service, the profile including graphical user interface elements corresponding to each of the plurality of wireless gift card providers, the social networking service providing at least one website in which a plurality of users interact with profiles of members of the social networking service via a graphical user interface, at least some of the users other than the first user being members of the social networking service, the profiles being generated by each of the respective members, the at least one website page including a graphical user interface element associated with each of wireless gift card providers, the at least one website page providing at least one graphical user interface element allowing a user to add or modify content displayed on the at least one website page;

monitoring, by the corresponding social networking service, a number of clicks associated with each of the wireless gift card providers on each of the social networking service website pages; and sending, by the wireless gift card server, data characterizing the number of monitored clicks for a particular wireless gift card provider account to a loyalty processor corresponding to such wireless gift card provider, the loyalty processor increasing a loyalty indicator associated with the corresponding account of the first user, the loyalty indicator being redeemable for rewards associated with the account.

* * * * *